US011986736B1

(12) United States Patent
Khan et al.

(10) Patent No.: US 11,986,736 B1
(45) Date of Patent: May 21, 2024

(54) ON-CHAIN CRYPTOGRAPHIC ASSETS APPLIED IN OFF-CHAIN ELECTRONIC GAME LEVELING AND PROGRESSION

(71) Applicant: Atlas Reality, Inc., Cedar Park, TX (US)

(72) Inventors: Tawsif Khan, Cedar Park, TX (US); Beau L. Button, Cedar Park, TX (US)

(73) Assignee: ATLAS REALITY, INC., Cedar Park, TX (US)

( * ) Notice: Subject to any disclaimer, the term of this patent is extended or adjusted under 35 U.S.C. 154(b) by 0 days.

(21) Appl. No.: 18/327,409

(22) Filed: Jun. 1, 2023

Related U.S. Application Data

(60) Provisional application No. 63/381,699, filed on Oct. 31, 2022.

(51) Int. Cl.
| | |
|---|---|
| *A63F 13/00* | (2014.01) |
| *A63F 13/67* | (2014.01) |
| *A63F 13/69* | (2014.01) |
| *A63F 13/792* | (2014.01) |
| *G06F 9/54* | (2006.01) |
| *H04L 9/00* | (2022.01) |

(52) U.S. Cl.
CPC .............. *A63F 13/69* (2014.09); *A63F 13/67* (2014.09); *A63F 13/792* (2014.09); *G06F 9/54* (2013.01); *H04L 9/50* (2022.05)

(58) Field of Classification Search
CPC .......... H04L 9/50; H04L 9/3236; A63F 13/71; A63F 13/79
See application file for complete search history.

(56) References Cited

U.S. PATENT DOCUMENTS

| 2020/0155944 A1* | 5/2020 | Witchey ................. A63F 13/86 |
| 2022/0230508 A1* | 7/2022 | Simons ................. H04L 9/0637 |
| 2023/0119641 A1* | 4/2023 | Meyers ................. A63F 13/352 |
| | | 463/42 |

* cited by examiner

*Primary Examiner* — David L Lewis
*Assistant Examiner* — Eric M Thomas
(74) *Attorney, Agent, or Firm* — Perkins Coie LLP

(57) ABSTRACT

A computer system operates an off-chain electronic game that includes in-game assets stored off of a blockchain. The computer system detects an occurrence of a progression event related to a particular in-game asset associated with a particular player. In response to the occurrence, the computer system increases an upgrade capacity of the particular in-game asset. The upgrade capacity controls a maximum number of attribute upgrades that can be applied to the particular in-game asset at a time. The computer system then permits or prevents application of attribute upgrades to the particular in-game asset based on the upgrade capacity. The computer system further permits or prevents application of attribute upgrades based on whether the attribute upgrades are being applied to other off-chain electronic games. An interoperability API is used to determine whether a given attribute upgrade is being used in another game.

20 Claims, 11 Drawing Sheets

ON-CHAIN CRYPTOGRAPHIC ASSETS APPLIED IN OFF-CHAIN ELECTRONIC GAME LEVELING AND PROGRESSION

CROSS-REFERENCE TO RELATED APPLICATIONS

This application claims priority to and the benefits of U.S. Provisional Application No. 63/381,699, titled "ON-CHAIN CRYPTOGRAPHIC ASSETS APPLIED IN OFF-CHAIN ELECTRONIC GAME LEVELING AND PROGRESSION" filed on Oct. 31, 2022. The content of the aforementioned application is herein incorporated by reference in its entirety.

TECHNICAL FIELD

The present disclosure is generally related to techniques for digital management of cryptographic assets, as well as game applications and ecosystems that implement cryptographic assets.

BACKGROUND

Computer gaming includes electronic games that involves interaction with a user interface or input device, such as a joystick, controller, keyboard, or motion sensing device, to generate visual feedback. The feedback is commonly shown on a video display device, such as a TV set, monitor, touchscreen, or virtual reality headset. Video games are sometimes augmented by audio feedback delivered through speakers or headphones, and sometimes with other types of feedback, including haptic technology. Video games can be defined based on their platform, which includes arcade video games, console games, and personal computer (PC) games. More recently, gaming has expanded onto mobile gaming through smartphones and tablet computers, virtual and augmented reality systems, and remote cloud gaming.

A non-fungible token (NFT) is a unique digital identifier that typically cannot be copied, substituted, or subdivided. Conventional NFTs are recorded in a blockchain, and used to certify authenticity and ownership. The ownership of an NFT is recorded in the blockchain and can be transferred by the owner, allowing NFTs to be sold and traded. NFTs typically contain references to digital files such as photos, videos, and audio. However, the traditional NFT business model is hinged on "selling" NFTs while the conventional video game business model is hinged on selling content upfront or bite-sized via in-app purchases. Players in a computer game may desire to "keep" the game items they have accrued through gaming even when the game servers are shut down. Therefore, the use of conventional NFTs poses challenges for traditional gaming, limiting the use case of "game collectibles" backed on a blockchain.

BRIEF DESCRIPTION OF THE DRAWINGS

Detailed descriptions of implementations of the present technology will be described and explained through the use of the accompanying drawings.

Figure 1:
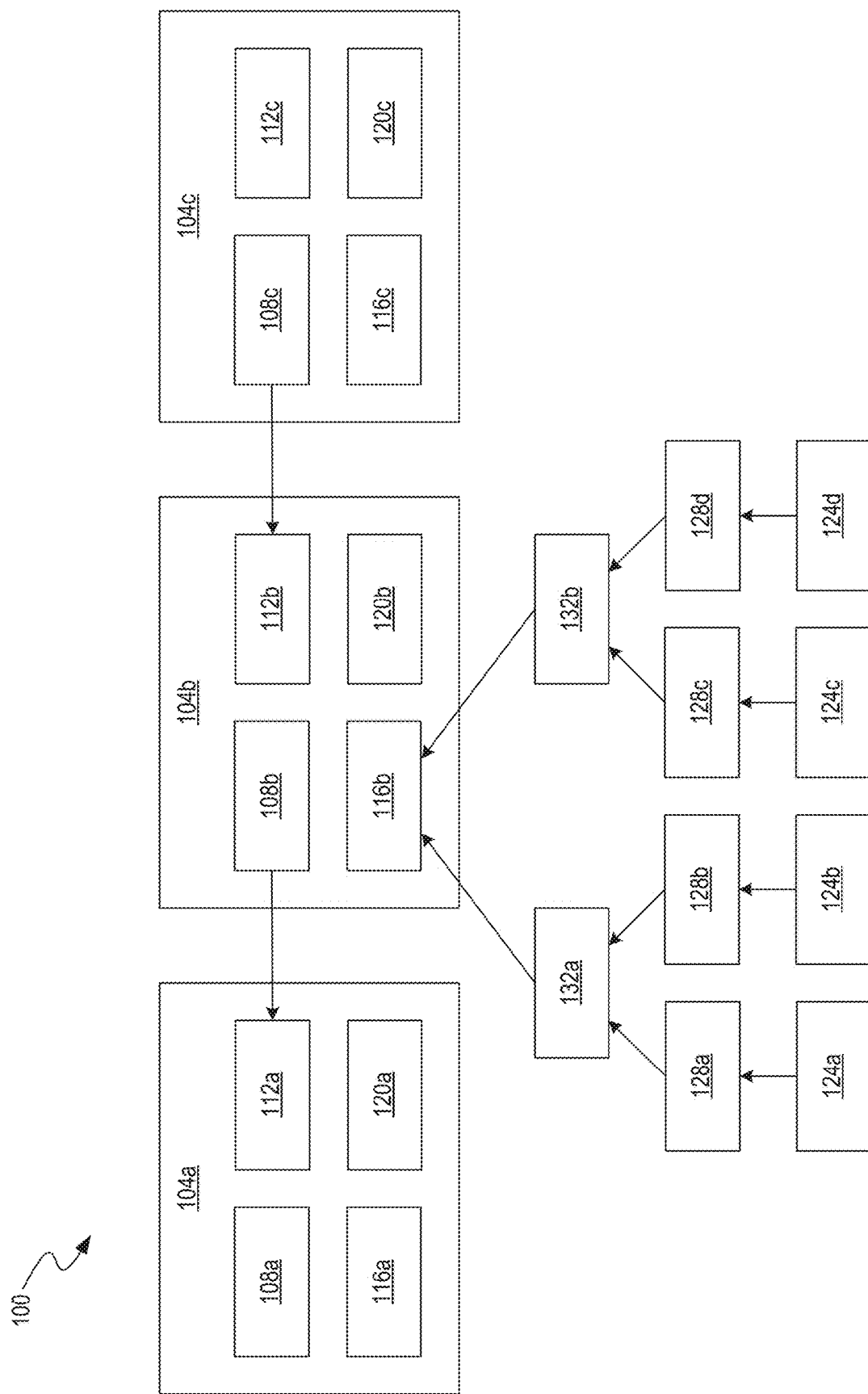
FIG. 1 is a block diagram illustrating an example structure including a portion of a blockchain.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Embodiments of the present disclosure are described thoroughly herein with reference to the accompanying drawings. Like numerals represent like elements throughout the several figures, and in which example embodiments are shown. However, aspects of the examples listed in the present document and concepts described herein can be embodied in many different forms and should not be construed as limited to the embodiments set forth herein. The examples set forth herein are non-limiting examples and are merely examples, among other possible examples.

Throughout this specification, plural instances (e.g., "610") can implement components, operations, or structures (e.g., "610a") described as a single instance. Further, plural instances (e.g., "610") refer collectively to a set of components, operations, or structures (e.g., "610a") described as a single instance. The description of a single component (e.g., "610a") applies equally to a like-numbered component (e.g., "610b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the examples listed at the end of the present document.

The disclosed technology includes methods, apparatuses, and systems for cryptographic application of non-fungible tokens to electronic gaming. The term electronic gaming is sometimes referred to as computer gaming or video gaming. Computer gaming includes electronic games that involves interaction with a user interface or input device, such as a joystick, controller, keyboard, or motion sensing device, to generate visual feedback. The feedback is commonly shown on a video display device, such as a TV set, monitor, touchscreen, or virtual reality headset. Video games are sometimes augmented by audio feedback delivered through speakers or headphones, and sometimes with other types of feedback, including haptic technology. Video games can be defined based on their platform, which includes arcade video games, console games, and personal computer (PC) games. More recently, gaming has expanded onto mobile gaming through smartphones and tablet computers, virtual and augmented reality systems, and remote cloud gaming.

The disclosed technology improves upon traditional game progression and incorporates blockchain-verified ownership of in-game assets (e.g., characters, items, environments) without significantly impacting game operation and performance. According to aspects disclosed herein, an electronic game is operated off-chain, and in-game assets, game engines, game servers, and/or the like for the electronic game reside off of a blockchain. Progression of in-game assets is characterized by increases to capacity, "slots", or opportunities of the in-game assets to be stocked with attribute upgrades or modifications. Attribute upgrades or modifications modify an attribute, parameter, characteristic, or data associated with an in-game asset, and an attribute upgrade is represented by an on-chain digital asset, such as an NFT attribute card. For example, a given NFT attribute card represents an increase of ten points to a damage parameter of an in-game item asset, and application of the given NFT attribute card to the in-game item asset causes the damage parameter to be increased by ten points. As another example, a number of hit points (HP) of an in-game character asset can be increased based on a given NFT attribute card being applied to the in-game character asset. Thus, as discussed, in-game progression events (e.g., a level-up event) for an in-game asset are tied to the capacity of the in-game asset for attribute upgrades (via application of NFT attributes), instead of being tied to the attribute upgrades themselves. As such, upon occurrence of an in-game progression event, a capacity parameter of the in-game event is modified, and the attributes, parameters, characteristics, or data of the in-game asset are not necessarily upgraded at the in-game progression event.

The attribute upgrades or modifications are represented and defined by on-chain cryptographic assets (e.g., NFTs) owned by players. Thus, while the electronic game and the in-game assets are located off-chain to reduce reliance on slow blockchain-related operations, ownership verification functionality provided by the blockchain is leveraged to provide players with ownership over attribute upgrades to the in-game assets. Indeed, in some examples, ownership of in-game attribute upgrades is not managed by a game itself, thereby reducing game size and resource footprint of the game. Instead, ownership functionality provided by a blockchain (e.g., via cryptographic wallets and on-chain consensus) is used to authenticate that a player owns a particular in-game attribute upgrade for use in a game and/or to authorize that the player can use the particular in-game attribute upgrade in the game.

The disclosed methods for "leasing" of NFTs in a cryptographic wallet amongst multiple games enables prevention of multiple spending and misuse of NFTs on multiple games. That is, while ownership of an NFT attribute upgrade by a player can be verified via a blockchain, the present disclosure includes techniques for controlling and managing authorization and usage of the NFT attribute upgrade in different games in a game network or ecosystem simultaneously.

The disclosed "smart contract" component of the generated NFTs include attributes to improve the characteristics of player characters and in-game items. Because the digital art is not part of the smart contract, game designers have increased flexibility in designing the digital art compared to traditional approaches. Moreover, players can move their attribute cards to any other game within the supported ecosystem.

Further, the disclosed technology addresses technical challenges related to computational load management of game servers, computing systems, and/or the like. In multiplayer electronic games, or generally in electronic applications serving multiple clients, coincident timing of certain event occurrences places significant computational and processing load on application servers and computing systems. For example, in an electronic game context, coincident timing of multiple level progression events each triggered by different players traditionally requires significant processing effort to upgrade and modify in-game data for in-game assets associated with the different players (e.g., calculating new statistics and attribute data for in-game assets).

The disclosed technology reduces the computational and processing load needed to handle such coincident in-game events. According to embodiments disclosed herein, level progression events result in a modification of capacity parameters for in-game assets. That is, instead of in-game asset data being modified, re-calculated, and/or the like in response to a level progression event, only a capacity parameter associated with the in-game asset data is modified. Modification of the capacity parameter enables attribute upgrades to be applied to the in-game asset at a point in time that is disconnected from the level progression event itself. Thus, the disclosed technology enables temporal separation or independence between a level progression event and the significant processing needed to modify in-game asset data to reflect the level progression event. As such, the disclosed technology reduces the amount of computational load needed to handle multiple coincident level progression events.

In one example, a computer system operates a particular electronic game of one or more electronic games being played by one or more players. Each player of the one or more players is represented by a player character that is stored off a blockchain. The computer system determines that a particular player character representing a particular player of the one or more players has reached a first level of the particular electronic game. The computer system, responsive to determining that the particular player character has reached the first level, increases a modification capacity of the particular player character. The modification capacity indicates a maximum number of attribute modifications (also referred to herein as attribute upgrades, NFT attributes, and the like) that can be applied to the particular player character at a time. The computer system applies, responsive to user input by the particular player, a number of attribute modifications that satisfies the modification capacity of the particular player character to the particular player character. Each of the attribute modifications is defined by an on-chain cryptographic asset that is owned by the particular player. The computer system sends a notification to an application programming interface (API) executed by the computer system. The notification indicates that one or more respective on-chain cryptographic assets for the number of attribute modifications are being used within the particular electronic game. The notification indicates that the particular NFT attribute is in use for the electronic game.

In one example, a computer system operates an electronic game that is being played by one or more players. Each player is associated with one or more in-game assets of the electronic game. The one or more in-game assets are stored off-chain by the computer system. The computer system detects an occurrence of a progression event related to a particular in-game asset associated with a particular player. The progression event is defined by one or more game conditions related to at least one of the particular player or the particular in-game asset. The computer system, in response to the occurrence, increases an upgrade capacity of the particular in-game asset. The upgrade capacity controls a maximum number of attribute upgrades that are applied to the particular in-game asset. The attribute upgrades are defined by on-chain cryptographic assets. The computer system, based on a determination that a number of attribute upgrades presently applied to the particular in-game asset is less than the upgrade capacity, applies a particular attribute upgrade defined by a particular on-chain cryptographic asset owned by the particular player to the particular in-game asset. The computer system transmits a notification to an application programming interface (API) executed by the computer system. The notification indicates that the particular on-chain cryptographic asset is in use for the electronic game.

In one example, a computer system operates a particular electronic game of a plurality of electronic games in a shared ecosystem. The particular electronic game includes a plurality of in-game assets associated with a plurality of players. The plurality of in-game assets are stored off-chain. The computer system detects an occurrence of a progression event for a particular in-game asset of the particular electronic game. The progression event is based on one or more conditions associated with the particular in-game asset being fulfilled. The computer system modifies, in response to the occurrence, a capacity parameter associated with the particular in-game asset. The computer system identifies a set of on-chain cryptographic assets that are owned by a particular player associated with the particular in-game asset. The computer system causes, for the particular player, display of a number of on-chain cryptographic assets of the set of on-chain cryptographic assets for application to the particular in-game asset. The number of on-chain cryptographic assets is based on the capacity parameter and a current number of on-chain cryptographic assets applied to the particular in-game asset.

In one example, a computer system operates a first electronic game of one or more electronic games. The first electronic game is being played by a player represented by a player character. The player character is stored off a blockchain. The computer system applies one or more attribute modifications to the player character within the first electronic game according to a modification capacity associated with the player character that defines a maximum number of attribute modifications for the player character. The one or more attribute modifications are defined by one or more on-chain cryptographic assets on the blockchain. The computer system receives a request to apply the one or more attribute modifications to an in-game asset within a second electronic game of the one or more electronic games. The in-game asset is stored off the blockchain. The computer system, responsive to receiving the request, determines, based on indicating the one or more on-chain cryptographic assets to an API, that the one or more attribute modifications are presently applied within the first electronic game. The computer system, responsive to determining that the one or more attribute modifications are presently applied within the first electronic game, prevents, via the API, the one or more attribute modifications from being applied to the in-game asset within the second electronic game.

In one example, a computer system operates a first electronic game of a plurality of electronic games. The computer system receives from a computer device of a player of the first electronic game, a request to apply an on-chain cryptographic asset to an in-game asset of the first electronic game. The in-game asset of the first electronic game is stored off a blockchain. The on-chain cryptographic asset defines an attribute modification for the in-game asset. The computer system, responsive to receiving the request, queries a game interoperability API to determine whether the on-chain cryptographic asset is being applied to a given in-game asset of a second electronic game of the plurality of electronic games. The computer system, responsive to receiving a response from the game interoperability API indicating that the on-chain cryptographic asset is being applied to the given in-game asset of the second electronic game, prevents the on-chain cryptographic asset from being applied to the in-game asset of the first electronic game.

In one example, a computer system operates a first electronic game of an ecosystem of electronic games. The computer system determines a set of on-chain cryptographic assets that are owned by a particular player and that define attribute modifications applicable to a given in-game asset of the first electronic game. The computer system identifies, using a game interoperability API, a subset of the on-chain cryptographic assets that are not applied to in-game assets of other electronic games of the ecosystem of electronic games. The computer system provides, to a computer system of the particular player, a visual representation within the first electronic game that indicates the subset of the on-chain cryptographic assets.

In one example, a computer system operates an electronic game stored off a blockchain. The electronic game is being played by a player. The computer system causes a non-fungible token (NFT) to be minted on the blockchain. The NFT comprises a smart contract corresponding to at least one attribute modification for use by the player for an in-game asset in the electronic game. The NFT references digital art associated with the in-game asset in the electronic game that is stored off the blockchain. The computer system receives, from a computer device of the player, a request to apply the at least one attribute modification to the in-game asset. The computer system, responsive to determining that application of the at least one attribute modification exceeds a capacity parameter associated with the in-game asset, prevents the at least one attribute modification from being applied to the in-game asset.

In one example, a computer system operate an electronic game stored off a blockchain. The computer system causes an on-chain cryptographic asset to be minted on the blockchain. The on-chain cryptographic asset is associated with a smart contract corresponding to at least one attribute modification that is applicable to an in-game asset of the electronic game. The on-chain cryptographic asset references digital art associated with the in-game asset for use in the electronic game. The computer system receives from a computer device of a particular player of the electronic game, a request to apply the at least one attribute modification to the in-game asset. The computer system, responsive to receiving the request, determines a modification capacity of the in-game asset. The computer system indicates, to the computer device of the particular player, whether or not applying the at least one attribute modification to the in-game asset is permitted based on the modification capacity.

In one example, a computer system causes an on-chain cryptographic asset to be minted on a blockchain. A smart contract associated with the on-chain cryptographic asset defines an attribute modification for a particular in-game asset of an electronic game being operated off of the blockchain. The computer system receives from a computer device of a particular player of the electronic game, a request to apply the attribute modification to the particular in-game asset. The computer system applies the attribute modification to the particular in-game asset based at least on a determination that the on-chain cryptographic asset is owned by the particular player.

FIG. 1 is a block diagram illustrating a portion of an example blockchain system 100. Blockchain system 100 includes blockchain 104. In embodiments, the blockchain 104 is a distributed ledger of transactions (e.g., a continuously growing list of records, such as records of transactions for digital assets such as cryptocurrency, bitcoin, or electronic cash) that is maintained by a blockchain system 100. For example, the blockchain 104 is stored redundantly at multiple nodes (e.g., computers) of a blockchain network. Each node in the blockchain network can store a complete replica of the entire blockchain 104. In some embodiments, the blockchain system 100 implements storage of an identical blockchain at each node, even when nodes receive transactions in different orderings. The blockchain 104 shown by FIG. 1 includes blocks 104a, 104b, 104c. Likewise, embodiments of the blockchain system 100 can include different and/or additional components or be connected in different ways.

The terms "blockchain" and "chain" are used interchangeably herein. In embodiments, the blockchain 104 is a distributed database that is shared among the nodes of a computer network. As a database, the blockchain 104 stores information electronically in a digital format. The blockchain 104 can maintain a secure and decentralized record of transactions (e.g., transactions 124a, 124b). For example, the ERC-721 or ERC-1155 standards are used for maintaining a secure and decentralized record of transactions. The blockchain 104 provides fidelity and security for the data record. In embodiments, blockchain 104 collects information together in groups, known as "blocks" (e.g., blocks 104a, 104b) that hold sets of information.

The blockchain 104 structures its data into chunks (blocks) (e.g., blocks 104a, 104b) that are strung together. Blocks (e.g., block 104c) have certain storage capacities and, when filled, are closed and linked to a previously filled block (e.g., block 104b), forming a chain of data known as the "blockchain." New information that follows a freshly added block (e.g., block 104b) is compiled into a newly formed block (e.g., block 104c) that will then also be added to the blockchain 104 once filled. The data structure inherently makes an irreversible timeline of data when implemented in a decentralized nature. When a block is filled, it becomes a part of this timeline of blocks. Each block (e.g., block 104a) in the chain 104 is given an exact timestamp (e.g., timestamp 112a) when it is added to the chain 104. In the example of FIG. 1, blockchain 104 includes multiple blocks 104a-c. Each of the blocks 104a-c can represent one or multiple transactions and can include a cryptographic hash of the previous block (e.g., previous hashes 108a-c), a timestamp (e.g., timestamps 112a-c), a transactions root hash (e.g., 116a-c), and a nonce (e.g., 120a-c). A transactions root hash (e.g., transactions root hash 116b) indicates the proof that the block 104b contains all the transactions in the proper order. The transactions root hash 116b proves the integrity of transactions in the block 104b without presenting all transactions.

In embodiments, the timestamp 112a-c of each of corresponding blocks 104a-c includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 120a-c of each of corresponding blocks 104a-c include any generated random or semi-random number. The nonce can be used by miners during proof of work (PoW), which refers to a form of adding new blocks of transactions to blockchain 104. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks 104a, 104b, 104c of exemplary blockchain 104 can include respective block hash 116a, 116b, 116c. Each of block hashes 116a-c can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 1, block 104b records transactions 124a-d. Each of the leaf nodes 128a-d contain a hash corresponding to transactions 124a-d respectively. As described above, a hash (e.g., the hash in leaf node 128a) can be a hash of components of a transaction (e.g., transaction 124a), for example, a reference that identifies an output of a prior transaction that is input to the transaction 124a, an attachment, and a command. Each of the non-leaf nodes 132a, 132b can contain a hash of the hashes of its child nodes (e.g., leaf nodes 12ba-b). In this example, node 132a can contain a hash of the hashes contained in 128a, 128b and node 132b can contain a hash of the hashes contained in 128c, 128d. The root node 116b can contain a hash of the hashes of child nodes 132a-b.

A Merkle tree representation of a transaction (e.g., 124a) allows an entity needing access to the transaction 124a to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 124a by generating a hash of the transaction summary and calculating the hashes of the nodes along the path to the root node. If the calculated hash of the root node matches the hash 128a of the transaction 124a, the transaction summary is confirmed as the one used in the transaction. Because only the portion of the Merkle tree relating to components that an entity needs is provided, the entity will not have access to other components. Thus, the confidentiality of the other components is not compromised.

In some examples, the blockchain 104 is a bitcoin system developed to allow digital assets such as electronic cash to be transferred directly from one party to another without going through a central authority, such as financial institution (e.g., as described in the white paper entitled "Bitcoin: A Peer-to-Peer Electronic Cash System" by Satoshi Nakamoto, hereby incorporated by reference in its entirety). A bitcoin (an electronic coin) can be represented by a chain of transactions that transfers ownership from one party to another party.

To transfer ownership of a digital asset, such as a bitcoin, using the blockchain 104, a new transaction, such as one of transactions 124a-d, is generated and added to a stack of transactions in a block, e.g., block 104b. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., 124a) against the account for the asset that indicates that the transaction 124a is a transfer of ownership and outputs a token identifying the second user as the next owner and a token identifying the asset. The transaction 124a is signed by the private key of the first user (i.e., the current owner), and the transaction 124a is evidence that the second user is now the new current owner and that ownership has been transferred from the first to the second user.

The new transaction 124a, which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the new transaction 124a. Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 104 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain 104 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 124a-d) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 124a in the blockchain 104 using a token that is a hash 128a of the computer code so that the computer code that is executed can be authenticated. When deployed, a constructor of the smart contract executes, initializing the smart contract and its state. The state of a smart contract is stored persistently in the blockchain 104. When a transaction 124a is recorded against a smart contract, a message is sent to the smart contract, and the computer code of the smart contract executes to implement the transaction (e.g., debit a certain amount from the balance of an account). The computer code ensures that all the terms of the contract are complied with before the transaction 124a is recorded in the blockchain 104.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., 124a) that transfers the ownership of the asset to the buyer and a transaction (e.g., 124b) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either transaction 124a, 124b is not successful, neither transaction is recorded.

When a message is sent to a smart contract to record a transaction 124a, the message is sent to each node that maintains a replica of the blockchain 104. Each node executes the computer code of the smart contract to implement the transaction 124a. For example, if a hundred nodes each maintain a replica of the blockchain 104, the computer code executes at each of the hundred nodes. When a node completes execution of the computer code, the result of the transaction 124a is recorded in the blockchain 104. The nodes employ a consensus algorithm to decide which transactions (e.g., 124c) to keep and which transactions (e.g., 124d) to discard. Although the execution of the computer code at each node helps ensure the authenticity of the blockchain 104, large amounts of computer resources are required to support such redundant execution of computer code.

Although blockchains can effectively store transactions 124a-d, the large amount of computer resources, such as storage and computational power, needed to maintain all the replicas of the blockchain can be problematic. To overcome this problem, some systems for storing transactions 124a-d do not use blockchains, but rather have each party to a transaction maintain its own copy of the transaction 124a. One such system is the Corda™ system developed by R3™ that provides a decentralized distributed ledger platform in which each participant in the platform has a node (e.g., computer system) that maintains its portion of the distributed ledger.

When parties agree on the terms of a transaction 124a, a party submits the transaction 124a to a notary, which is a trusted node, for notarization. The notary maintains a consumed output database of transaction outputs that have been input into other transactions. When a transaction 124a is received, the notary checks the inputs to the transaction 124a against the consumed output database to ensure that the outputs that the inputs reference have not been spent. If the inputs have not been spent, the notary updates the consumed output database to indicate that the referenced outputs have been spent, notarizes the transaction 124a (e.g., by signing the transaction or a transaction identifier with a private key of the notary), and sends the notarized transaction to the party that submitted the transaction 124a for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., 124b), the non-validating notary determines that the prior output of a prior transaction (e.g., 124a), that is, the input of the current transaction 124b, has not been consumed. If the prior output has not been consumed, the non-validating notary notarizes the transaction 124b by signing a hash 128b of the transaction. To notarize a transaction 124b, a non-validating notary needs only the identification of the prior output (e.g., the hash 128a of the prior transaction 124a and the index of the output) and the portion of the Merkle tree needed to calculate the hash 128b of the transaction 124b.

As described herein, in some embodiments, the blockchain 104 uses one or more smart contracts to enable more complex transactions. For example, a validating notary validates a transaction (e.g., 124d), which includes verifying that prior transactions 124a-c in a backchain of transactions are valid. The backchain refers to the collection of prior transactions (e.g., 124c) of a transaction 124d, as well as prior transactions 124a-b of those prior transactions 124c, and so on. To validate a transaction 124d, a validating notary invokes validation code of the transaction 124d. In one example, a validating notary invokes validation code of a smart contract of the transaction 124d. The validation code performs whatever checks are needed to comply with the terms applicable to the transaction 124d. In some implementations, the checking includes retrieving the public key of the owner from the prior transaction 124c (pointed to by the input state of the transaction 124d) and checks the signature of the transaction 124d, ensuring that the prior output of a prior transaction that is input has not been consumed, and checking the validity of each transaction (e.g., 124c) in the backchain of the transactions. If the validation code indicates that the transaction 124d is valid, the validating notary notarizes the transaction 124d and records the output of the prior transaction 124c as consumed.

In some examples, to verify that the transactions 124a-d in a ledger stored at a node are correct, the blocks 104a-c in the blockchain 104 can be accessed from oldest 104a to newest 104c, generating a new hash of the block 104c and comparing the new hash to the hash 108c generated when the block 104c was created. If the hashes are the same, then the transactions in the block are verified. In one example, the Bitcoin system also implements techniques to ensure that it would be infeasible to change a transaction 124a and regenerate the blockchain 104 by employing a computationally expensive technique to generate a nonce 120b that is added to the block when it is created. A bitcoin ledger is sometimes referred to as an Unspent Transaction Output ("UTXO") set because it tracks the output of all transactions that have not yet been spent.

Figure 2A:
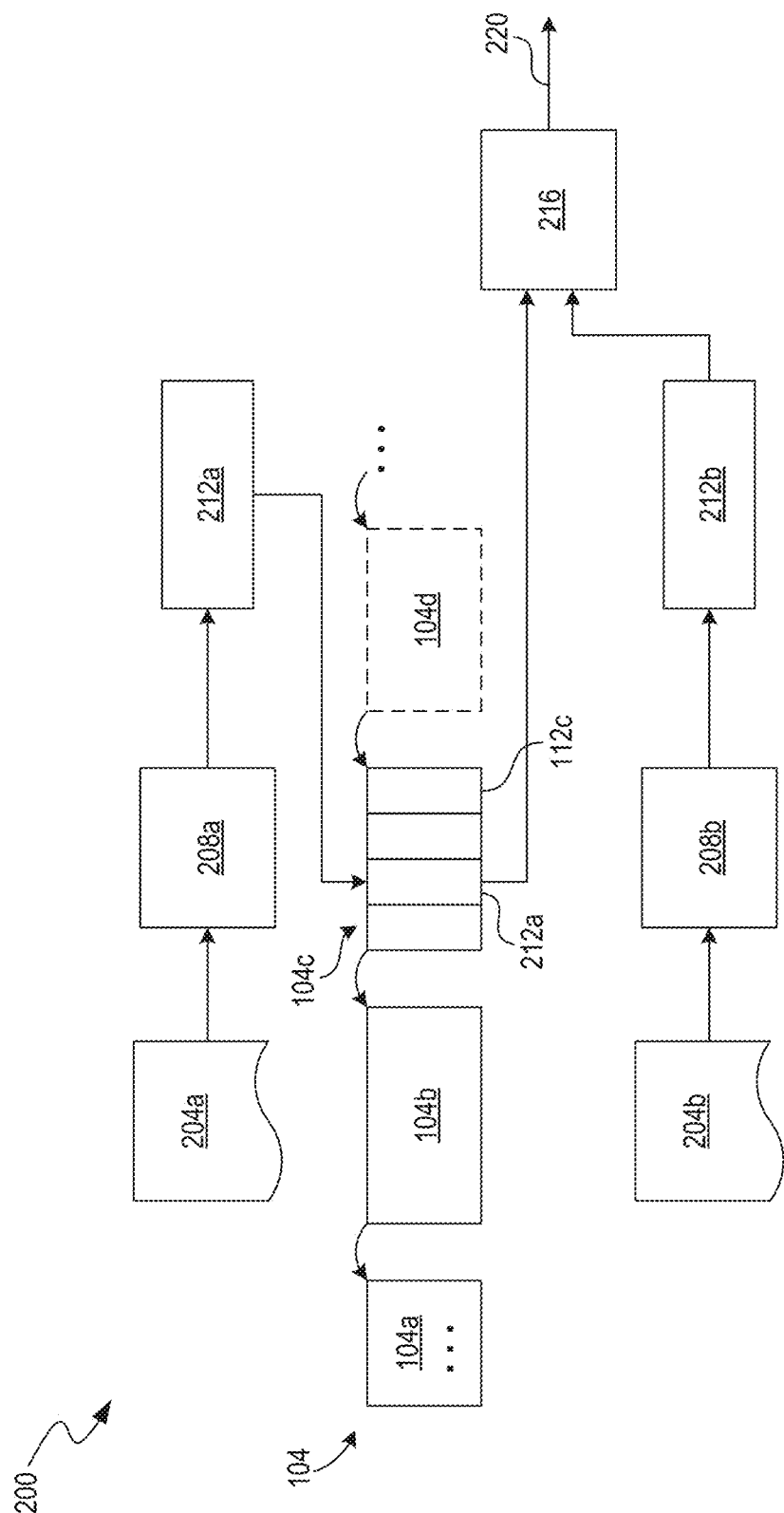
FIG. 2A is a drawing illustrating an example hash algorithm.

FIG. 2A illustrates a process 200 that uses a hash algorithm to generate a non-fungible token (NFT) or perform a cryptographic transaction on a blockchain. A blockchain 104, e.g., as shown in FIG. 2A, is also illustrated and described in detail with reference to FIG. 1. The process 200 can be performed by a computer system such as that described with reference to FIG. 10 and/or by nodes of the blockchain 104. Some embodiments include different and/or additional steps or perform steps in different orders.

In embodiments, a digital message, electronic art, a digital collectible, any other form of digital content, or a combination thereof 204a is hashed using hashing algorithm 208a. The hashing algorithm 208a (sometimes referred to as a "hash function") can be a function used to map data of arbitrary size (e.g., content 204a) to fixed-size values (e.g., hash values 212a). The hash values 212a that are returned by the hash function 208a can be called hash values, hash codes, digests, or hashes. The hash values 212a can be used to index a fixed-size table called a hash table. A hash table, also known as a hash map, is a data structure that implements an associative array or dictionary, which is an abstract data type that maps keys (e.g., content 204a) to hash values 212a.

The output of the hashed content 204a (e.g., hash values 212a) can be inserted into a block (e.g., block 104c) of the blockchain 104 (e.g., comprising blocks such as blocks 104a-d). The block 104c can include, among other things, information such as timestamp 112c. In order to verify that the block 104c is correct, a new hash value 212b is generated by applying hashing algorithm 208b to the digital content 204b. The new hash value 212b is compared to the hash value 212a in the blockchain 104 at comparison step 216. If the new hash value 212b is the same as the hash value 212a of the block 104c, the comparison yields an indication that they match. For example, the decision 220 can indicate that the hashes 212a-b are the same or different. The hashes can be indicated to be the same if the characters of the hash match. The hashing algorithms 208a-b can include any suitable hashing algorithm. Examples include Message Digest 5 (MD5), Secure Hashing Algorithm (SHA) and/or the likes.

Components of the process 200 can generate or validate an NFT, which is a cryptographic asset that has a unique identification code and metadata that uniquely identifies the NFT. In one example, the digital content 204a can be hashed and minted to generate an NFT, or the content 204a can represent an NFT that is verified using the process 200 and the content 204b. An NFT can include digital data (e.g., 212a) stored in the blockchain 104. The ownership of an NFT (e.g., 212a) is recorded in the blockchain 104 and transferrable by an owner, allowing the NFT 212a to be sold and traded. The NFT 212a contains a reference to digital files such as photos, videos, or audio (e.g., content 204a). Because NFTs are uniquely identifiable assets, they differ from cryptocurrencies, which are fungible. In particular, NFTs function like cryptographic tokens, but unlike cryptocurrencies such as Bitcoin or Ethereum™, NFTs are not mutually interchangeable, and so are not fungible.

The NFT can be associated with a particular digital or physical asset such as images, art, music, and sport highlights (e.g., content in blocks 104a) and can confer licensing rights to use the asset in a particular block 104a for a specified purpose. As with other assets, NFTs are recorded on a blockchain when a blockchain 104 concatenates records containing cryptographic hashes-sets of characters that identify a set of data-onto previous records, creating a chain of identifiable data blocks 104a-d. A cryptographic transaction process enables authentication of each digital file by providing a digital signature that tracks NFT ownership. In embodiments, a data link that is part of the NFT records points to details about where the associated art (content in blocks 104a) is stored.

Minting an NFT (e.g., 212a) can refer to the process of turning a digital file (e.g., 204a) into a crypto collectible or digital asset 212a on blockchain 104 (e.g., the Ethereum™ blockchain). The digital item or file (e.g., content 204a) can be stored in the blockchain 104 and typically cannot be edited, modified, or deleted. The process of uploading a specific item onto the blockchain 104 is known as "minting." For example, "NFT minting" can refer to a process by which a digital art or digital content 204a becomes a part of the Ethereum™ blockchain. Thus, the process turns digital content 204a into a crypto asset 212a, which is easily traded or bought with cryptocurrencies on a digital marketplace without an intermediary.

Figure 2B:
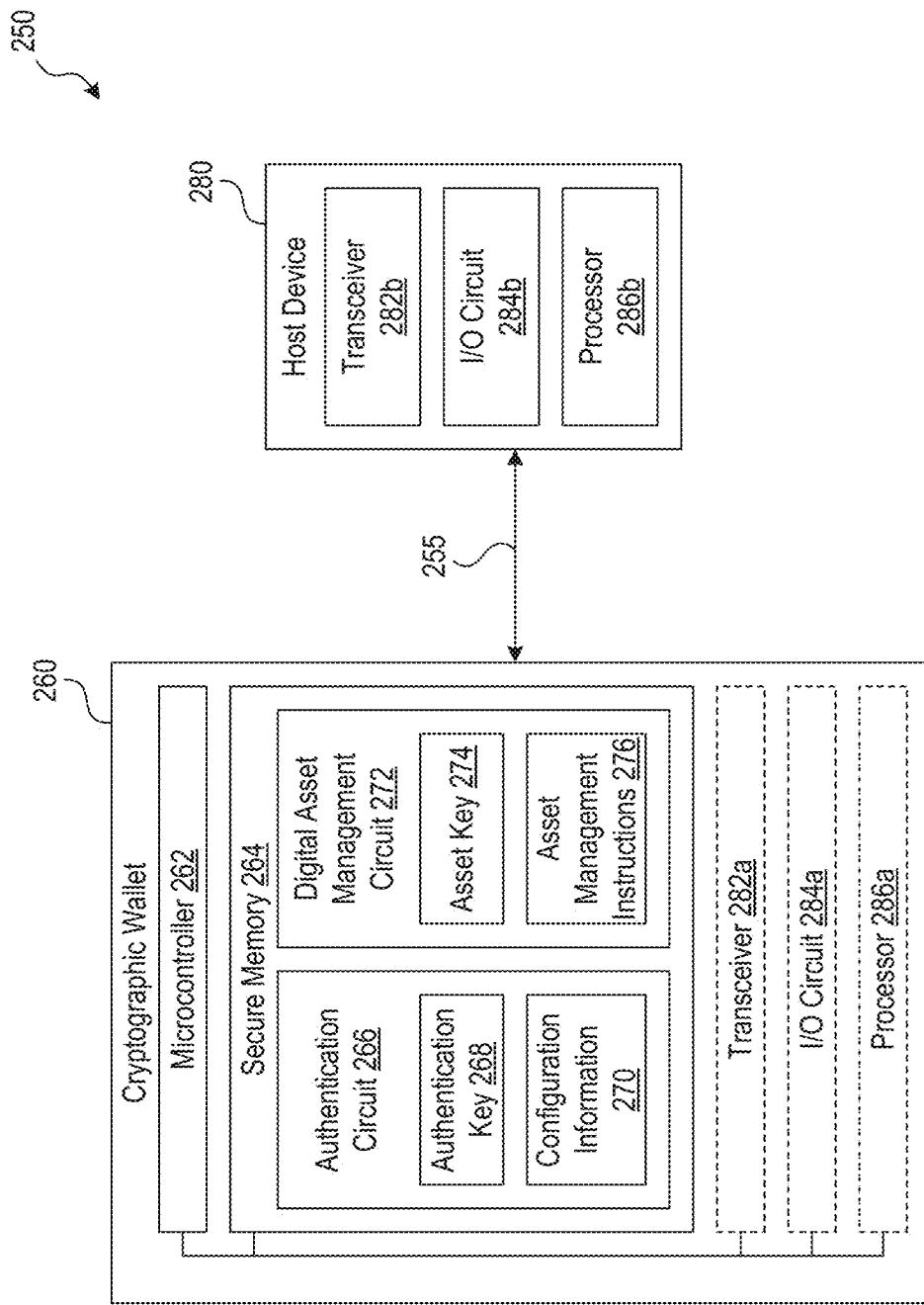
FIG. 2B is a block diagram illustrating an example cryptographic wallet.

FIG. 2B is a block diagram 250 illustrating an example cryptographic wallet 260. As a general overview, cryptographic wallet 260 is an electronic entity that allows users to securely manage digital assets. According to various embodiments, the cryptographic wallet 260 can be a hardware-based wallet (e.g., can include dedicated hardware component(s)), a software-based wallet, or a combination thereof. Example digital assets that can be stored and managed using the cryptographic wallet 260 include digital coins, digital tokens, and/or the like. In some embodiments, tokens are stored on a blockchain system, such as the blockchain system 100 described in FIG. 1. In some embodiments, the cryptographic wallet 260 is capable of connecting to and managing assets that are native to or associated with multiple, different blockchain systems.

As defined herein, the terms "coin" and "token" refer to a digital representation of a particular asset, utility, ownership interest, and/or access right. Any suitable type of coin or token can be managed using various embodiments of the cryptographic wallet 260. In some embodiments, tokens include cryptocurrency, such as exchange tokens and/or stablecoins. Exchange tokens and/or stablecoins can be native to a particular blockchain system 100 and, in some instances, can be backed by a value-stable asset, such as fiat currency, precious metal, oil, or another commodity. In some embodiments, tokens are utility tokens that provide access to a product or service rendered by an operator of the blockchain system 100 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership. In some embodiments, tokens are decentralized finance (DeFi) tokens. DeFi tokens can be used to access feature sets of DeFi software applications (dApps) built on the blockchain system 100. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system 100) or off-chain (e.g., implemented as computer software on computing devices that are separate from the blockchain system 100).

As shown, the cryptographic wallet 260 of FIG. 2B is communicatively coupled to the host device 280 (e.g., a mobile phone, a laptop, a tablet, a desktop computer, a wearable device, a point-of-sale (POS) terminal, an automated teller machine (ATM) and the like) via the communication link 255. In some embodiments, the host device 280 can extend the feature set available to the user of the cryptographic wallet 260 when it is coupled to the host device 280. For instance, the host device can provide the user with the ability to perform balance inquiries, convert tokens, access exchanges and/or marketplaces, perform transactions, access computing systems, and/or the like.

In some embodiments, the cryptographic wallet 260 and the host device 280 can be owned and/or operated by the same entity, user, or a group of users. For example, an individual owner of the cryptographic wallet 260 can also operate a personal computing device that acts as a host device 280 and provides enhanced user experience relative to the cryptographic wallet 260 (e.g., by providing a user interface that includes graphical features, immersive reality experience, virtual reality experience, or similar). In some embodiments, the cryptographic wallet 260 and the host device 280 can be owned and/or operated by different entities, users and/or groups of users. For example, the host device 280 can be a point-of-sale (POS) terminal at a merchant location, and the individual owner of the cryptographic wallet 260 can use the cryptographic wallet 260 as a method of payment for goods or services at the merchant location by communicatively coupling the two devices for a short period of time (e.g., via chip, via near-field communications (NFC), by scanning of a bar code, by causing the cryptographic wallet 260 to generate and display a quick response (QR) code, and/or the like) to transmit payment information from the cryptographic wallet 260 to the host device 280.

The cryptographic wallet 260 and the host device 280 can be physically separate and/or capable of being removably coupled. The ability to physically and communicatively uncouple the cryptographic wallet 260 from the host device 280 and other devices enables the air-gapped cryptographic wallet 260 to act as "cold" storage, where the stored digital assets are moved offline and become inaccessible to the host device 280 and other devices. Further, the ability to physically and communicatively uncouple the cryptographic wallet 260 from the host device 280 allows the cryptographic wallet 260 to be implemented as a larger block of physical memory, which extends the storage capacity of the cryptographic wallet 260, similar to a safety deposit box or vault at a brick-and-mortar facility.

Accordingly, in some embodiments, the cryptographic wallet 260 and the host device 280 are physically separate entities. In such embodiments, the communication link 255 can include a computer network. For instance, the cryptographic wallet 260 and the host device 280 can be paired wirelessly via a short-range communications protocol (e.g., Bluetooth, ZigBee, infrared communication) or via another suitable network infrastructure. In some embodiments, the cryptographic wallet 260 and the host device 280 are removably coupled. For instance, the host device 280 can include a physical port, outlet, opening, or similar to receive and communicatively couple to the cryptographic wallet 260, directly or via a connector.

In some embodiments, the cryptographic wallet 260 includes tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the cryptographic wallet 260 can include an integrated circuit, such as a SIM card, a smart cart, and/or the like. For instance, in some embodiments, the cryptographic wallet 260 can be a physical smart card that includes an integrated circuit, such as a chip that can store data. In some embodiments, the cryptographic wallet 260 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the cryptographic wallet 260 and the host device 280 are non-removably coupled. For instance, various components of the cryptographic wallet 260 can be co-located with components of the host device 280 in the housing of the host device 280. In such embodiments, the host device 280 can be a mobile device, such as a phone, a wearable, or similar, and the cryptographic wallet 260 can be built into the host device. The integration between the cryptographic wallet 260 and the host device 280 can enable improved user experience and extend the feature set of the cryptographic wallet 260 while preserving computing resources (e.g., by sharing the computing resources, such as transceiver, processor, and/or display or the host device 280). The integration further enables the ease of asset transfer between parties. The integration can further enhance loss protection options, as recovering a password or similar authentication information, rather than recovering a physical device, can be sufficient to restore access to digital assets stored in the cryptographic wallet 260. In some embodiments, the non-removably coupled cryptographic wallet 260 can be air-gapped by, for example, disconnecting the host device 280 from the Internet.

As shown, the cryptographic wallet 260 can include a microcontroller 262. The microcontroller 262 can include or be communicatively coupled to (e.g., via a bus or similar communication pathway) at least a secure memory 264. The cryptographic wallet 260 can further include a transceiver 282a, and input/output circuit 284a, and/or a processor 286a. In some embodiments, however, some or all of these components can be omitted.

In some embodiments, the cryptographic wallet 260 can include a transceiver 282a and therefore can be capable of independently connecting to a network and exchanging electronic messages with other computing devices. In some embodiments, the cryptographic wallet 260 does not include a transceiver 282a. The cryptographic wallet 260 can be capable of connecting to or accessible from a network, via the transceiver 282b of the host device 280, when the cryptographic wallet 260 is docked to the host device 280. For example, in some embodiments, the user of the cryptographic wallet 260 can participate in token exchange activities on decentralized exchanges when the cryptographic wallet 260 is connected to the host device 280.

In some embodiments, the cryptographic wallet 260 can include an input/output circuit 284a, which includes user-interactive controls, such as buttons, sliders, gesture-responsive controls, and/or the like. The user-interactive controls can allow a user of the cryptographic wallet 260 to interact with the cryptographic wallet 260 (e.g., perform balance inquiries, convert tokens, access exchanges and/or marketplaces, perform transactions, access computing systems, and/or the like). In some embodiments, the user can access an expanded feature set, via the input/output circuit 284b of the host device 280, when the cryptographic wallet 260 is docked to the host device 280. For example, host device 280 can include computer-executable code structured to securely access data from the secure memory 264 of the cryptographic wallet 260 and to perform operations using the data. The data can include authentication information, configuration information, asset keys, and/or token management instructions. The data can be used by an application that executes on or by the host device 280. The data can be used to construct application programming interface (API) calls to other applications that require or use the data provided by cryptographic wallet 260. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 264 is shown to include an authentication circuit 266 and a digital asset management circuit 272. The authentication circuit 266 and/or digital asset management circuit 272 include computer-executable code that, when executed by one or more processors, such as one or more processors 286a and/or 286b, performs specialized computer-executable operations. For example, the authentication circuit 266 can be structured to cause the cryptographic wallet 260 to establish, maintain and manage a secure electronic connection with another computing device, such as the host device 280. The digital asset management circuit 272 can be structured to cause the cryptographic wallet 260 to allow a user to manage the digital assets accessible via the cryptographic wallet 260. In some embodiments, the authentication circuit 266 and the digital asset management circuit 272 are combined in whole or in part.

As shown, the authentication circuit 266 can include retrievably stored security, authentication, and/or authorization data, such as the authentication key 268. The authentication key 268 can be a numerical, alphabetic, or alphanumeric value or combination of values. The authentication key 268 can serve as a security token that enables access to one or more computing systems, such as the host device 280. In some embodiments, when the cryptographic wallet 260 is paired or docked to (e.g., establishes an electronic connection with) the host device 280, the user is prompted to enter authentication information via the input output circuit(s) 284a and/or 284b. The authentication information can include a PIN, a password, a pass phrase, biometric information (e.g., fingerprint, a set of facial features, a retinal scan), a voice command, and/or the like. The authentication circuit 266 can compare the user-entered information to the authentication key 268 and maintain the electronic connection if the items match at least in part.

As shown, the authentication circuit 266 can include retrievably stored configuration information 270. The configuration information 270 can include a numerical, alphabetic, or alphanumeric value or combination of values. These items can be used to enable enhanced authentication protocols. For instance, the configuration information 270 can include a timeout value for an authorized connection between the cryptographic wallet 260 and the host device 280. The configuration information 270 can also include computer-executable code. In some embodiments, where a particular cryptographic wallet 260 is set up to pair with only one or a small number of pre-authorized host devices 280, the configuration information 270 includes a device identifier and/or other device authentication information, and the computer-executable code is structured to verify the device identifier and/or other device authentication information against the information associated with or provided by the host device 280. When a pairing is attempted, the computer-executable code can initiate or cause the host device 280 to initiate an electronic communication (e.g., an email message, a text message, etc.) using user contact information stored as configuration information 270.

As shown, the digital asset management circuit 272 can include retrievably stored digital asset data, such as the asset key 274. The asset key 274 can be a numerical, alphabetic, or alphanumeric value or combination of values. In some embodiments, the asset key 274 is a private key in a public/private key pair, a portion thereof, or an item from which the private key can be derived. Accordingly, the asset key 274 proves ownership of a particular digital asset stored on a blockchain system 100. The asset key 274 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The cryptographic wallet 260 can be identified as a party to a blockchain transaction on the blockchain system 100 using a unique cryptographically generated address (e.g., the public key in the public/private key pair).

As shown, the digital asset management circuit 272 can also include retrievably stored asset management instructions 276. The asset management instructions 276 can include a numerical, alphabetic, or alphanumeric value or combination of values. These items can be used to enable computer-based operations related to managing digital assets identified by the asset key(s) 274. For instance, the asset management instructions 276 can include parameter values, metadata, and/or similar values associated with various tokens identified by the asset key(s) 274 and/or by the blockchain systems 100 associated with particular tokens. The asset management instructions 276 can also include computer-executable code. In some embodiments, for example, asset management functionality (e.g., balance inquiry and the like) can be executable directly from the cryptographic wallet 260 rather than or in addition to being executable from the host device 280.

Smart Contracts Using NFT Attributes

Figure 3:
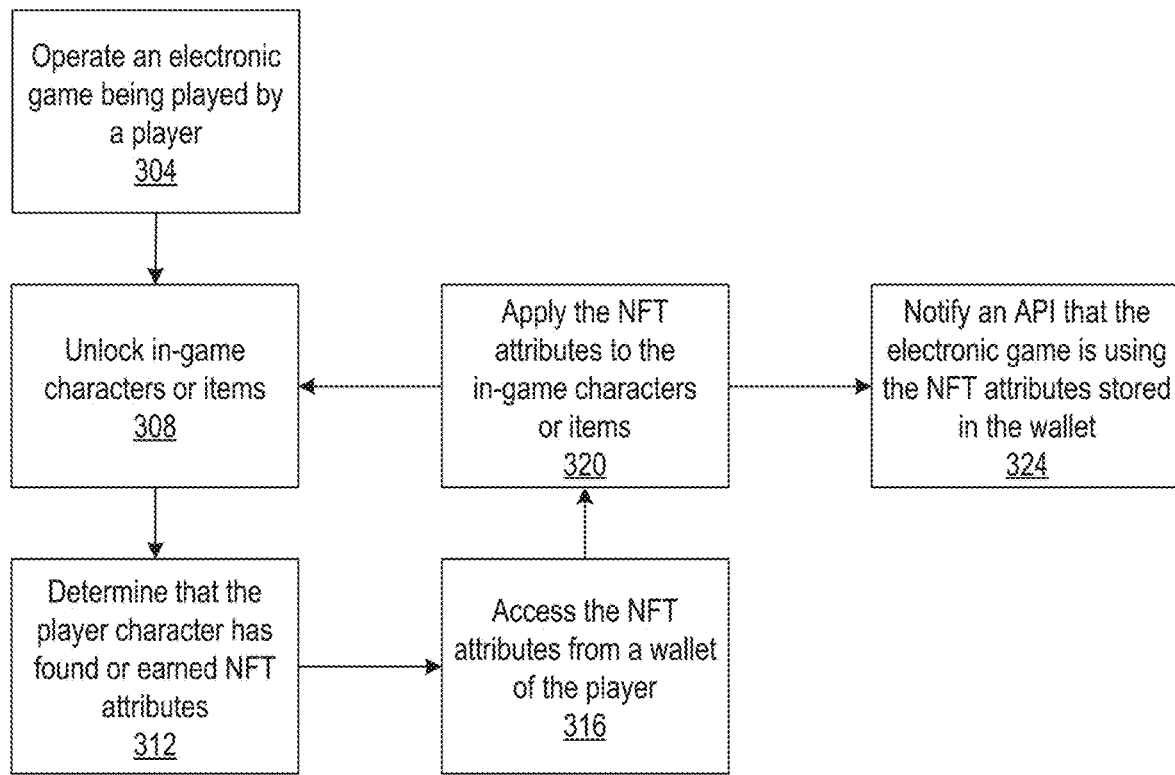
FIG. 3 is a flow diagram illustrating an example process for cryptographic application of non-fungible tokens to electronic gaming.

FIG. 3 is a flow diagram illustrating an example process for cryptographic application of non-fungible tokens to electronic gaming. According to aspects of the disclosed technology, technical benefits are provided by controlling a capacity of in-game assets for attribute upgrades (in contrast to controlling the attribute upgrades themselves) based on in-game progression events. In particular, in response to an in-game progression event, a maximum number of attribute upgrades provided by NFTs for an in-game asset is modified. Ownership of in-game assets by players is therefore managed on-chain and can be verified by consensus techniques. Thus, the game itself does not need to store ownership information of NFT attributes for players.

In some embodiments, the process shown by FIG. 3 is performed by a game server. A game server (also sometimes referred to as a host) is a server, which is the authoritative source of events in a multiplayer video game. The server transmits enough data about its internal state to allow its connected clients to maintain their own accurate version of the game world for display to players. A game server also receives and processes each player's input. In some embodiments, the process of FIG. 3 is performed by a computer system, e.g., the example computer system 1000 illustrated and described in more detail with reference to FIG. 10. Particular entities, for example, a machine learning (ML) system perform some or all of the steps of the process in other embodiments. An example ML system 900 is illustrated and described in more detail with reference to FIG. 9. Likewise, embodiments can include different and/or additional steps or can perform the steps in different orders.

At 304, a computing system operates an electronic game. In some examples, the electronic game is a single-player game or a multi-player game, for example, the electronic game is being played by one or more players. The electronic game includes a plurality of in-game assets, including player character or avatar assets, environmental assets, item or object assets, and/or the like.

At 308, the computing system manages the accessibility of different in-game assets for the players. For example, the computing system unlocks certain character assets, item assets, and/or the like for a player in response to certain prerequisite conditions being satisfied by the player. For example, a prerequisite condition defines a number of other in-game item assets that need to be owned by the player before another in-game item asset is unlocked for ownership and use by the player. Satisfaction of certain predetermined and perquisite conditions to unlock in-game assets are sometimes referred to herein as a progression event, level-up event, and/or the like. Example progression events include a player character earning a threshold number of experience points (XP), reaching a particular location in an in-game environment, performing a particular interaction with an in-game environmental and/or item asset, and/or the like. The computing system detects progression events while operating the electronic game based on monitoring player data and game data.

At 312, the computing system determines that the player has found or earned NFT attributes. For example, at least some of the in-game assets unlocked for the player at 308 are NFT attributes. As discussed, an NFT attribute represents and describes an attribute upgrade for an existing in-game asset in the electronic game. For example, a given NFT attribute describes an increase to HP attribute for an existing character asset, an increase to a damage attribute for an existing item asset, or removal of a negative attribute for an existing item asset, and/or the like.

At 316, the computing system accesses a wallet of the player. An example wallet is illustrated and described in more detail with reference to FIG. 2B. In some embodiments, the wallet of the player is a data entity that stores a plurality of cryptographic keys that reference a plurality of NFTs owned by the player. In some embodiments, the computing system accesses the wallet of the player to add a cryptographic key that references a NFT attribute, or a particular NFT that represents and describes an attribute upgrade for an in-game asset of the electronic game. For example, the NFT attribute is newly minted on a blockchain in response to 312, and the key is added to the wallet of the player to assign ownership of the player over the newly-minted NFT attribute. An example blockchain 104 is illustrated and described in more detail with reference to FIG. 1. In another example, the electronic game or an entity associated with the electronic game (e.g., a developer, a publisher, an operator) is associated with a wallet that references a plurality of unlockable NFT attributes, and the computing system causes an unlockable NFT attribute to transfer ownership from the wallet of the electronic game or game entity to the wallet of the player, causes a new NFT attribute to be minted in the player's wallet from an unlockable NFT attribute, and/or the like. In some embodiments, the computing system access the wallet of the player further to identify other NFT attributes owned by the player. In some embodiments, the wallet of the player is accessible by the computing system based on the player providing a public cryptographic address associated with the wallet. In some embodiments, prior to or at the beginning of operating the game, the player is prompted for a public cryptographic address for the wallet associated with the player, such that unlocked NFT attributes can be easily transferred to the player's wallet.

At 320, the computing system applies an NFT attribute to an in-game asset. In some embodiments, the computing system applied the NFT attribute in response to a user input or selection of the NFT attribute. The computing system applied the NFT attribute to the in-game asset if the in-game asset includes enough capacity, slots, or opportunities for an additional NFT attribute. For example, if the in-game asset is associated with a capacity parameter that dictates that a maximum of four NFT attributes can be applied to the in-game asset, and if four NFT attributes have already been applied to the in-game asset, then the computing system does not apply the NFT attribute to the in-game asset. However, in the described example, if three or fewer NFT attributes have been applied to the in-game asset, then application of the NFT attribute to the in-game asset is permitted. In some embodiments, the computing system applies the NFT attribute after determining that the player owns the NFT attribute. For example, the computing system uses the blockchain to verify that the NFT attribute is currently owned by the player (based on cryptographic addresses of the player's wallet) and has not been transferred or sold to another user.

In some embodiments, application of an NFT attribute to an in-game asset includes modifying (e.g., increasing, decreasing) attributes of the in-game asset according to the attribute upgrade represented and described by the NFT attribute. For example, computing system updates attribute data associated with the in-game asset, an attribute state associated with the in-game asset, and/or the like. Thus, as in-game asset attribute data is modified in response to application of an NFT attribute (e.g., at 320) instead of in response to an occurrence of an in-game progression event (e.g., at 308), an ability of the computing system to handle coincident in-game progression events of multiple players is improved.

In some embodiments, applying the NFT attribute to an in-game asset includes causing display or presentation of the NFT attribute or an indication thereof. For example, a visual representation of the in-game asset is modified to reflect the application of the NFT attribute to the in-game asset. In some embodiments, a display or presentation of the NFT attribute is based on digital art or visual data that is referenced by the NFT attribute. For example, the digital art or visual data is stored by the IPFS and is retrieved by the computing system. In some embodiments, the digital art or visual data is combined with in-game art or visual data to form a game-specific visual representation of the NFT attribute.

At 324, the computing system notifies an API that a particular NFT attribute has been applied to an in-game asset of the electronic game. The API is configured to manage NFT attribute usage or application among multiple electronic games within an ecosystem. For example, the API is configured to prevent one NFT attribute from being applied to multiple in-game assets in multiple electronic games. Thus, the computing system notifies an API that the particular NFT attribute has been applied such that the API blocks application of the particular NFT attribute in other electronic games.

Game Balancing Using an Interoperable Application Programming Interface

Figure 4:
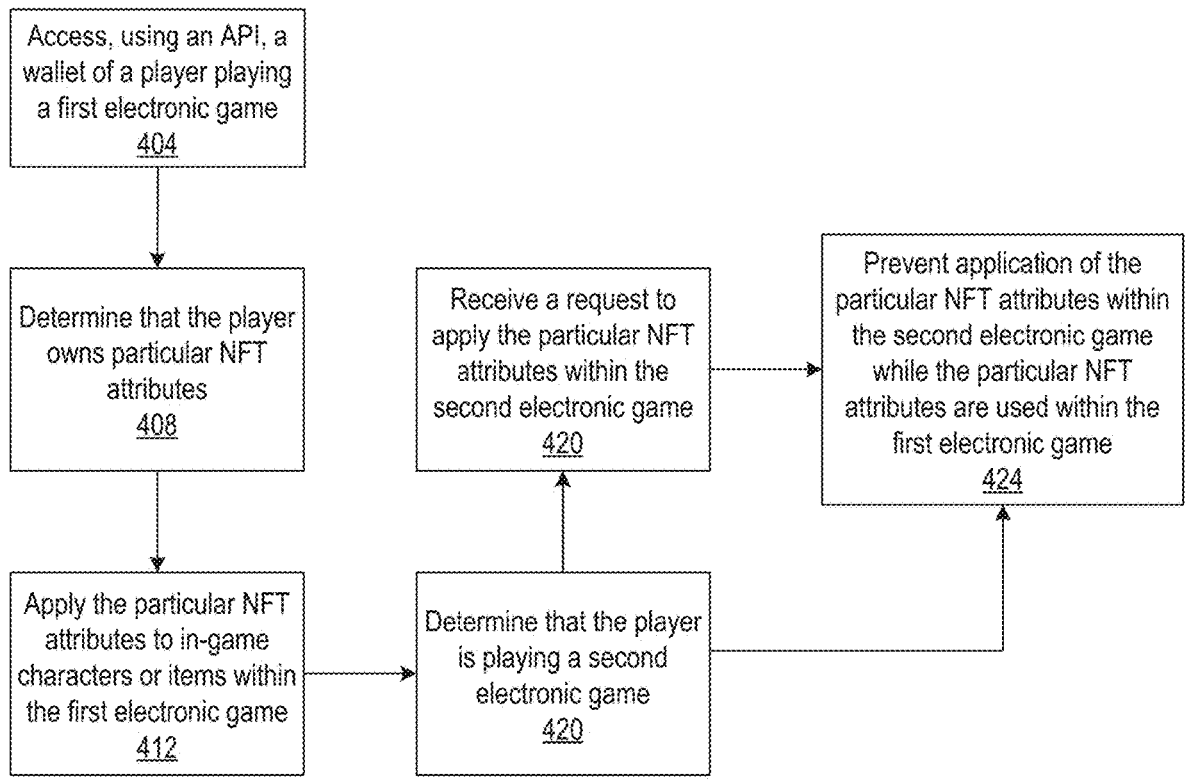
FIG. 4 is a flow diagram illustrating an example process for cryptographic application of non-fungible tokens to electronic gaming.

FIG. 4 is a flow diagram illustrating an example process for cryptographic application of non-fungible tokens to electronic gaming. Generally, the example process relates to an interoperable API that controls application of NFTs in different electronic games of a game network or ecosystem. An example game network or ecosystem can include games that are associated with a common entity (e.g., a developer, a published, an operator), games that share a similar theme or style (e.g., games related to Star Wars, a game and its sequels), games of a common genre (e.g., shooter games, fantasy games, role-playing games, strategy games), games that operate on a common game engine (e.g., Unreal Engine, Blender), games configured for operation of a specific gaming system, and/or the like. In some embodiments, the interoperable API provides as aspect of control and regulation over attribute upgrades to in-game assets. According to some embodiments, a computer system (e.g., the example computer system 1000 illustrated and described in more detail with reference to FIG. 10) that implements the interoperable API performs the example process of FIG. 4. In some embodiments, the process is performed by a game server. Likewise, embodiments can include different and/or additional steps or can perform the steps in different orders.

At 404, a computer system accesses, using an API, a wallet of a player playing a first electronic game. For example, the API is a wallet API of a cryptographic wallet management platform. An example wallet is illustrated and described in more detail with reference to FIG. 2B.

At 408, the computer system determines that the player owns particular NFT attributes. For example, the wallet of the player includes a set of cryptographic keys that each reference a NFT on a blockchain, with the NFT representing and describing an attribute upgrade for in-game assets of one or more electronic games. An example blockchain 104 is illustrated and described in more detail with reference to FIG. 1. In some embodiments, the player owns an NFT attribute based on actions within a given electronic game. For example, the player earns the NFT attribute based on completing certain objectives, satisfying certain pre-defined conditions, reaching a certain level or location, and/or the like within a given electronic game.

At 412, the computer system applies a particular NFT attribute to a particular in-game asset of the first electronic game. For example, the computer system receives a request from a computer device of a player to apply a selected NFT attribute to a selected in-game asset. In some embodiments, the computer system applies each of the particular NFT attributes (determined at 408) at one or more available in-game assets (e.g., depending on applicability rules and token capacities) such that every NFT attribute owned by the player is applied.

At 416, the computer system determines that the player is playing a second electronic game, for example, another electronic game in a shared and/or compatible ecosystem with the first electronic game. For example, the computer system is associated with the first electronic game and is in communication with other computer systems associated with other electronic games in the ecosystem. As another example, the computer system is associated with the ecosystem and is aware of player activity in each electronic game of the ecosystem.

At 420, the computer system receives a request to apply the particular NFT attribute to an in-game asset within the second electronic game. For example, within the second electronic game, the player attempts to insert the particular NFT attribute into a slot of the in-game asset of the second electronic game. As another example, the player queries which NFT attributes can be applied to the in-game asset of the second electronic game.

At 424, the computer system prevents application of the particular NFT attribute within the second electronic game while the particular NFT attribute is still applied to the particular in-game asset of the first electronic game. In some embodiments, the computer system prevents the application based on implementing a token availability API. When the particular NFT attribute was previously applied in the first electronic game (at 412), the token availability API receives a notification that indicates that the particular NFT attribute is not available outside of the first electronic game. Thus, at 424, the token availability API indicates to the second electronic game (e.g., in a response to a request from the second electronic game) that application of the particular NFT attribute is not permitted. In some examples, the token availability API receives a notification that the particular NFT attribute is no longer being used in the first electronic game, and accordingly permits the application of the NFT attribute to in-game assets of the second electronic game.

In some embodiments, the API is configured with different usage constraints for NFT attributes. For example, rather than only allowing a particular NFT attribute to be applied in a maximum of one game at any given time, the API is configured to allow simultaneous application of a particular NFT attribute in two games. In some embodiments, data or a smart contract associated with a particular NFT attribute indicates a maximum number of games that the particular NFT attribute can be simultaneously applied in, and the API is configured to use said data or smart contract to determine whether the particular NFT attribute can be applied in the second electronic game. In some embodiments, usage constraints for a particular NFT attribute are based on the player and characteristics/demographics thereof. For example, a maximum number of games to which the particular NFT attribute can be simultaneously applied corresponds to a subscription level of the player, an account status associated with the player, a tenure or experience level of the player, and/or the like.

Game Leveling Using Off-Blockchain Game Characters

Figure 5A:
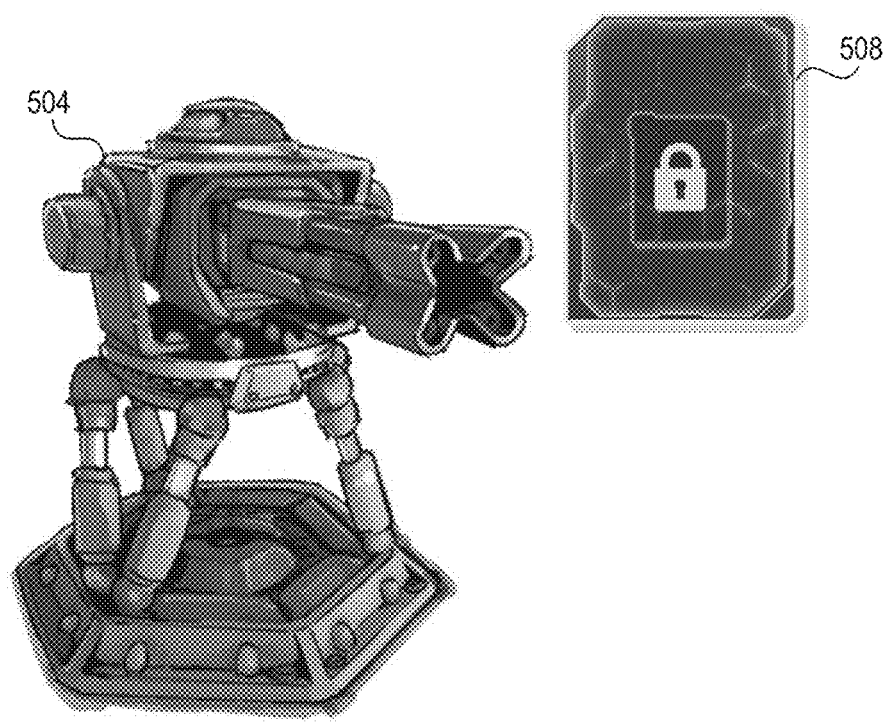
FIG. 5A is a drawing illustrating example in-game items and characters.
Figure 5B:
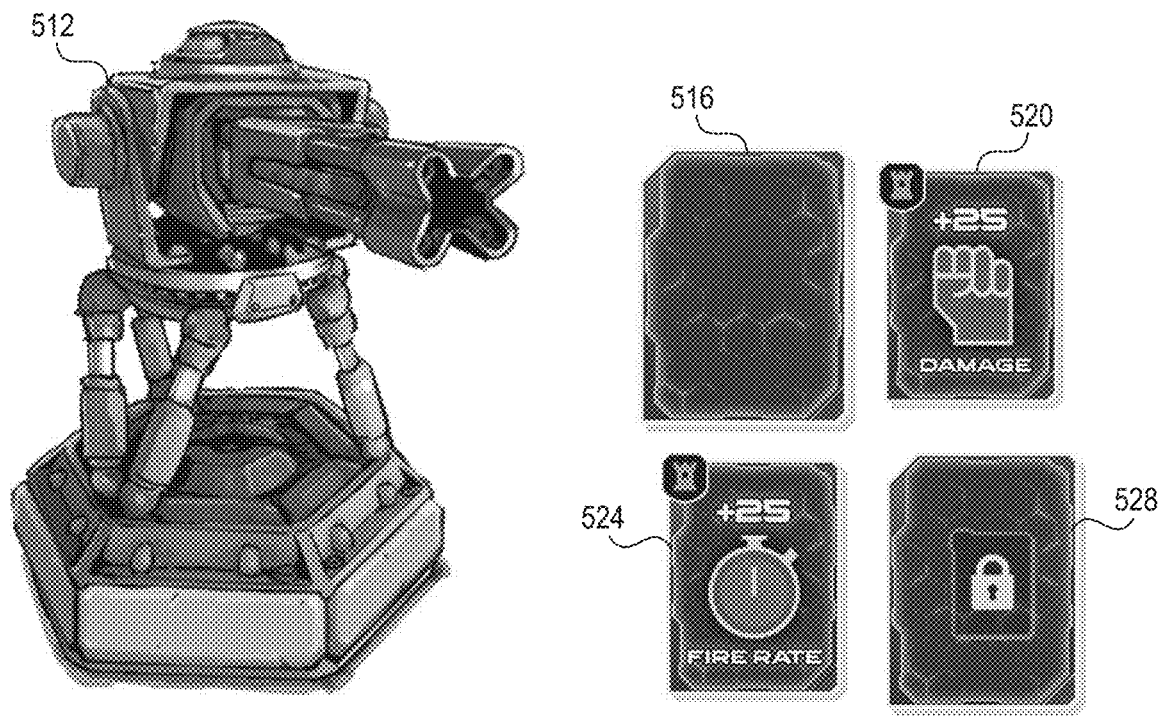
FIG. 5B is a drawing illustrating example in-game items and characters.

FIGS. 5A and 5B are drawings illustrating example in-game assets and NFT attributes. As discussed herein, aspects of the disclosed technology relate to implementing token capacity for in-game assets, the token capacity for an in-game asset controlling a maximum number of on-chain cryptographic assets or tokens (e.g., NFTs) that can be applied to the in-game asset, with the on-chain cryptographic assets or tokens defining attribute modifications or upgrades for the in-game asset. An example blockchain 104 is illustrated and described in more detail with reference to FIG. 1. In some examples, a token capacity is also referred to as an upgrade capacity, a modification capacity, and/or the like.

According to example embodiments, the token capacity of an in-game asset is dynamically modified at in-game progression events. By dynamically modifying token capacity in response to occurrences of in-game progression events (in contrast to modifying attribute data), technical benefits are provided, as intense computing and processing load from multiple coincident events is minimized.

FIG. 5A illustrates a first in-game asset 504 of an example electronic game. FIG. 5A also illustrates a token capacity of the first in-game asset 504, represented as a first slot 508 in which an NFT attribute can be inserted, equipped, assigned, and/or the like. In some embodiments, the token capacity of the first in-game asset 504 (specifically, one slot for one attribute upgrade) corresponds to a level, a location, a state, a classification, an asset type, and/or the like of the first in-game asset 504. For example, in the illustrated example, the first in-game asset 504 is a level one turret or a small turret, and the first in-game asset 504 accordingly has a token capacity of one.

FIG. 5B illustrates a second in-game asset 512 of the example electronic game. In the illustrated example, the second in-game asset 512 is an evolution or progression of the first in-game asset 504. For example, the second in-game asset 512 is a level two turret, a medium turret, a turret at a different level/stage/location, and/or the like. Due to the second in-game asset 512 being a progressed or developed version of the first in-game asset 504, a token capacity of the second in-game asset 512 is increased. As illustrated, the token capacity of the second in-game asset 512 includes four slots 516, 520, 524, 528, which is increased from the one slot capacity of the first in-game asset 504.

With the increased slot capacity that corresponds to the increased level or progression, the second in-game asset 512 has an increased capacity to have its attributes upgraded. That said, the attributes of the second in-game asset 512 are not upgraded or modified until NFT attributes are equipped, inserted, assigned, and/or the like into the four slots 516, 520, 524, 528. Thus, without use of the NFT attributes, the second in-game asset 512 simply has an increased potential compared to the first in-game asset 504 but features the same attributes. Indeed, because the attributes of the in-game asset are not changed as the first in-game asset 504 progresses or evolves into the second in-game asset 512, significant computing or processing effort is conserved during the progression/evolution.

Instead, computing operations to modify attribute data of an in-game asset are performed when a player equips NFT attributes to the slots (e.g., 508, 516, 520, 524, 528) of the in-game asset. In some embodiments, the player equips NFT attributes owned by the player, and these NFT attributes are identified via a wallet of the player that stores cryptographic keys referencing the NFT attributes. An example wallet is illustrated and described in more detail with reference to FIG. 2B. In some embodiments, the electronic game presents or displays a set of NFT attributes that (i) are owned by the player, (ii) are not presently being applied in other electronic games, and (iii) are applicable to the in-game asset.

In response to user selection of an NFT attribute to the in-game asset, the computer system updates attribute data for the in-game asset. In the illustrated example of FIG. 5B, an NFT attribute that represents and describes a 25 point increase to a damage attribute of the second in-game asset 512 is equipped in slot 520. As a result, the computer system increases the damage attribute of the second in-game asset 512 by 25 points. Similarly, an NFT attribute that represents and describes a 25 point increase to a fire rate attribute of the second in-game asset 512 is equipped in slot 524, and the computer system increases the fire rate attribute of the second in-game asset 512 accordingly.

Following application of a given NFT attribute to a given in-game asset, the computer system communicates with a token availability API, an interoperability API, and/or the like. In particular, the computer system indicates to the API that the given NFT attribute has been applied to the given in-game asset. In response, the API prevents the given NFT attribute from being applied to in-game assets of other electronic games.

According to aspects of the disclosed technology, the in-game asset and the attribute data thereof is stored off-chain, for example, by a game server that operates the electronic game to which the in-game asset belongs. As such, reliance on blockchain operations to provide and operate in-game assets is reduced, while blockchain-related items can still be used to enhance operation of the off-chain in-game assets.

Figure 6:
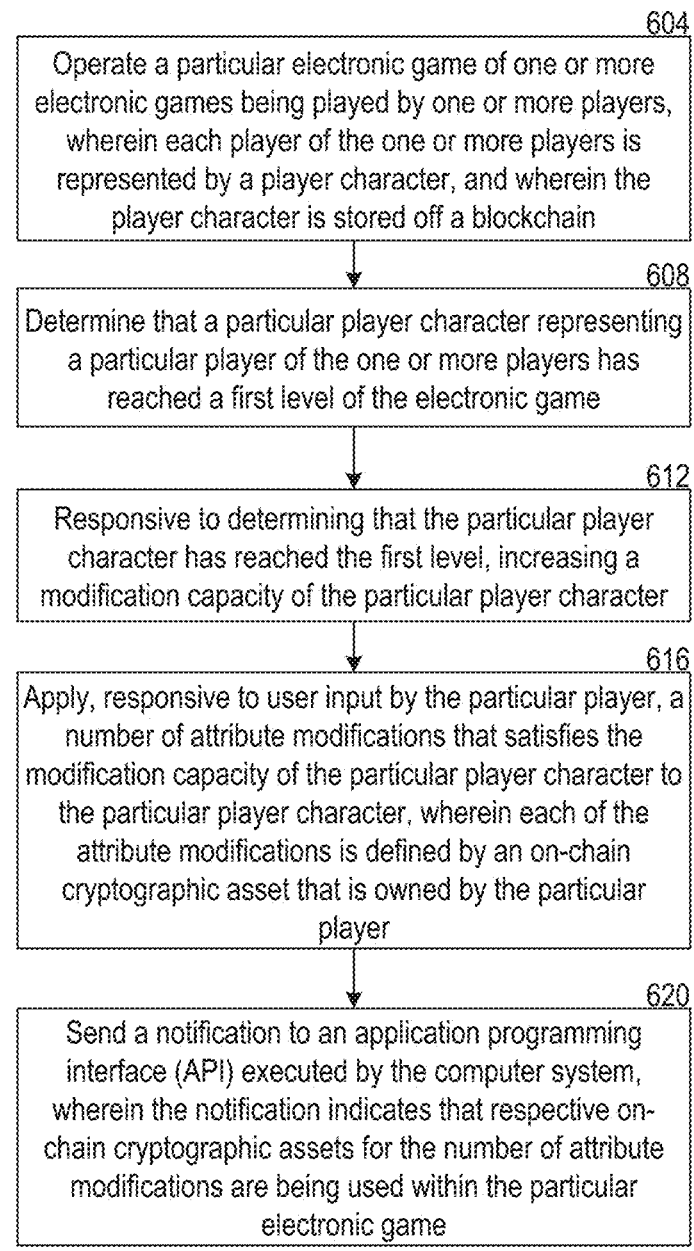
FIG. 6 is a flow diagram illustrating an example process for cryptographic application of non-fungible tokens to electronic gaming.

FIG. 6 is a flow diagram illustrating an example process for cryptographic application of non-fungible tokens to electronic gaming. In some embodiments, the process is performed by a game server. A game server (also sometimes referred to as a host) is a server, which is the authoritative source of events in a multiplayer video game. The server transmits enough data about its internal state to allow its connected clients to maintain their own accurate version of the game world for display to players. A game server also receives and processes each player's input. In some embodiments, the process of FIG. 6 is performed by a computer system, e.g., the example computer system 1000 illustrated and described in more detail with reference to FIG. 10. Particular entities, for example, a machine learning (ML) system perform some or all of the steps of the process in other embodiments. An example ML system 900 is illustrated and described in more detail with reference to FIG. 9. Likewise, embodiments can include different and/or additional steps or can perform the steps in different orders.

In step 604, a computer system operates a particular electronic game of one or more electronic games being played by one or more players. Each player of the one or more players is represented by a player character. A player character (also known as a playable character or PC) is a fictional character in a video game whose actions are controlled by a player. The player character is stored off a blockchain. An example blockchain 104 is illustrated and described in more detail with reference to FIG. 1.

In some embodiments, the electronic game include a plurality of in-game assets that are stored off-chain. For example, the in-game assets include player characters or avatar assets, environmental assets, item or object assets, projectile or dynamic assets, interactable assets, and/or the like. In some embodiments, in-game assets include attribute that define how each asset interacts with others and/or acts in response to player actions.

In step 608, the computer system determines that a particular player character representing a particular player of the one or more players has reached a first level of the electronic game. In some examples, a level refers to a state, a classification, a tier, a rank, and/or the like for an in-game asset such as the particular player character. Progression through levels generally is achieved through satisfaction or completion of pre-defined requirements, such as a player character accumulating a threshold number of XP or item assets, or a player character reaching a particular location in an in-game environment.

In-game assets that can progress through levels includes items and objects within the game world that can be collected or used by a player or, occasionally, a non-player character. Items are sometimes called pick-ups. Items are most often beneficial to the player character. Some games contain detrimental items, such as cursed pieces of armor that confers a negative bonus to the wearer and cannot be removed until the curse itself is lifted; the means to do this require a particular NFT attribute. In some embodiments, the particular NFT attribute represents a modification, upgrade, increase, or the like of an attribute of the in-game asset (e.g., the armor item in the game). Some items can be necessary for the completion of quests or to advance through a game. An item can be unique, and only appear once at a specific location, often after completing a particular task. In some embodiments, the in-game item is associated with one or more slots in which NFT attribute upgrades or modifications are applied to the in-game item.

In some embodiments, a number of slots for an in-game item is defined as a token capacity and controls a maximum number of NFT attributes that can be applied to the in-game item at a time. Insertion of an NFT attribute into a slot of the in-game item results in the NFT attribute being applied to the in-game item. Thus, a player can continue applying NFT attributes to slots of an in-game item until a capacity is reached. In some embodiments, the number of slots or capacity for an in-game item is dynamically modified, for example, as the in-game item or associated assets reach certain levels, certain locations, certain classifications, certain states, and/or the like. For example, a capacity of an in-game item increases linearly (e.g., one slot at item level 1, two slots at item level 2, three slots at item level 3), geometrically (e.g., two slots at item level 1, four slots at item level 2, six slots at item level 3), exponentially (e.g., one slots, four slots, nine slots, sixteen slots at item levels 1, 2, 3, 4 respectively), and/or the like.

In step 612, the computer system increases a modification capacity or token capacity of the particular player character responsive to determining that the particular player character has reached the first level. In some embodiments, the computer system dynamically changes modification capacity of in-game assets (e.g., including player characters, in-game items, objects) responsive to progression events for the in-game assets.

In some embodiments, the computer system unlocks certain items or objects for use by the particular player character at different levels, and each unlocked item is associated with a token capacity for attribute upgrades for respective attributes. In some embodiments, the in-game item is unlocked for the particular player character based on certain pre-determined conditions being satisfied.

In some embodiments, the computer system rewards an NFT attribute to the player for completing or satisfying various in-game conditions. The computer system causes the one or more NFT attributes to be minted on the blockchain. For example, the one or more NFT attributes are minted in response to the particular player character reaching the second level or in response to other in-game events (e.g., a level-up or progression event). In particular, an NFT attribute is an NFT that represents and describes an upgrade to an attribute of an in-game item, and in some embodiments, the NFT attribute is minted on the blockchain in response to certain pre-determined conditions within the electronic game being satisfied. In some examples, existing NFT attributes exist on the blockchain and are traded between players, purchased by players, sold by players, and/or the like. The minting process publishes the unique NFT attributes on the blockchain, such that the NFT attributes can be bought, sold, and traded. In embodiments, the computer system is notified by a designer of the electronic game of the type of digital art or other digital collectible (e.g., player character, in-game item, game points, armor, game skin, or ammunition) to be represented by the NFT. Cryptocurrency from a hot wallet, connected to the Internet, can be used to pay for the minting or purchase the NFT. For example, the NFT can be minted on a marketplace, and the digital asset can be added to a player's collection.

In some embodiments, the computer system stores one or more cryptographic keys in a wallet of the particular player. An example wallet is illustrated and described in more detail with reference to FIG. 2B. A cryptographic key is a string of data that is used to lock or unlock cryptographic functions, including authentication, authorization and encryption. Cryptographic keys are grouped into cryptographic key types according to the functions they perform. A digital wallet is a device, physical medium, program, or a service that stores the public and/or private keys for cryptocurrency transactions. In addition to this basic function of storing the keys, a cryptocurrency wallet more often also offers the functionality of encrypting and/or signing information. Signing can for example result in executing a smart contract, a cryptocurrency transaction, or identification.

In some embodiments, the wallet operates by generating a theoretical or random number of a length that depends on the algorithm size of the blockchain's technology requirements. The number can be converted to a private key using the specific requirements of the cryptography algorithm. A public key can be generated from the private key using the cryptographic algorithm. The private key is used by a player to access and send NFTs and is private to the owner, whereas the public key is to be shared to any third party to receive NFTs. The blockchain will record the transaction of the public address when the NFT is minted and NFT attributes are added. The one or more keys in the player's wallet reference the one or more NFT attributes stored on the blockchain. For example, the keys point to a blockchain address that stores the certificate of ownership.

In step 616, the computer system applies the one or more NFT attributes to the in-game item using the one or more keys. In some embodiments, application of the NFT attribute includes modifying an attribute of the in-game item in accordance with the attribute upgrade represented or defined by the NFT attribute. For example, the in-game item defines a damage attribute (defining how damage actions in the game are effectuated) associated with the in-game item, and application of a NFT attribute related to a damage increase includes changing the damage attribute of the in-game item to reflect the damage increase. As discussed, a particular number of NFT attributes can be applied to the in-game item according to a capacity of the in-game item (e.g., defined by a capacity parameter associated with the in-game item), and according to the disclosed technology, the capacity of the in-game item changes in response to in-game progression events.

In some embodiments, application of a given NFT attribute to a given in-game asset is controlled by various rules of the electronic game. For example, such rules can dictate that the given NFT attribute can only be applied when the given in-game asset is at a certain level, a certain location, a certain classification, a certain state, and/or the like. In some embodiments, said rules that define game-specific parameters by which the given NFT attribute can be applied to a given in-game asset are included in a smart contract associated with the NFT attribute and stored in the blockchain. In other embodiments, said rules are stored and used off-chain.

In some embodiments, applying an NFT attribute to an in-game asset includes causing display of an indication of the NFT attribute. For example, the indication of the NFT attribute include digital art referenced by the NFT attribute (e.g., digital art referenced by the NFT stored on the blockchain, digital art stored on the blockchain), digital art associated with the electronic game, or a combination thereof. In some embodiments, the computer system causes display of an indication of each NFT attribute presently applied to the in-game asset along with the visual representation of the in-game asset.

In step 620, the computer system sends a notification to an application programming interface (API) executed by the computer system. In embodiments, the API implements communication between at least two of the computer system, the one or more electronic games, wallets of the one or more players, or the blockchain. For example, the API is a type of software interface, offering services to the one or more electronic games, the wallets of the one or more players, or the blockchain. A game designer of the one or more electronic games can incorporate the API into their code or software. A designer can also choose to call only a portion of the API. The calls that make up the API are also known as subroutines, methods, requests, or endpoints.

The notification indicates that the particular electronic game is using the one or more NFT attributes referenced by the one or more keys stored in the wallet. For example, the notification is a trigger, a message, or an alert. The notification can be encoded in different formats. The formats specify how the bits in the notification are used to encode information. In an example, the notification uses lossless data compression. In an example, the notification can act as a container for other types of data and metadata. In an example, the notification can contain any stream of characters, including possible control characters, and be encoded in one of various character encoding schemes. In some implementations, the notification is separated into headers, payloads, and footers.

In some embodiments, the notification causes the API to prevent simultaneous application of the one or more NFT attributes to in-game assets in other electronic games. For example, the API is a token availability API. In some embodiments, the computer system determines that an NFT attribute is no longer being applied to the in-game item. For example, the player removes the NFT attribute from one of the slots of the in-game item, the player stops playing the electronic game, and/or the like. As a result, the computer system permits transfer of the NFT attribute to in-game assets of other electronic games. For example, the computer system sends another notification to the API to stop the API from continuing to prevent application of the NFT attribute in other games. Thus, for example, the player can transfer the NFT attribute to a player character in another game to reach a next level in the other game, to accomplish an objective, and/or the like.

Figure 7:
FIG. 7 is a flow diagram illustrating an example process for cryptographic application of non-fungible tokens to electronic gaming.

FIG. 7 is a flow diagram illustrating an example process for cryptographic application of non-fungible tokens to electronic gaming. In some embodiments, the process is performed by a game server. A game server (also sometimes referred to as a host) is a server, which is the authoritative source of events in a multiplayer video game. The server transmits enough data about its internal state to allow its connected clients to maintain their own accurate version of the game world for display to players. A game server also receives and processes each player's input. In some embodiments, the process of FIG. 7 is performed by a computer system, e.g., the example computer system 1000 illustrated and described in more detail with reference to FIG. 10. Particular entities, for example, a machine learning (ML) system perform some or all of the steps of the process in other embodiments. An example ML system 900 is illustrated and described in more detail with reference to FIG. 9.

Likewise, embodiments can include different and/or additional steps or can perform the steps in different orders.

In step 704, a computer system operates a first electronic game of one or more electronic games. The first electronic game is being played by a player represented by a player character. The player character is stored off a blockchain. An example blockchain 104 is illustrated and described in more detail with reference to FIG. 1.

In some embodiments, the computer system stores one or more keys in a wallet of the player. The one or more keys reference one or more attribute modifications or NFT attributes stored on the blockchain. The wallet is readable by an API executed by the computer system. For example, the keys are stored in the wallet of the player based on an in-game or in-application purchase associated with the player for acquiring the one or more NFT attributes. As another example, the keys are stored in the wallet of the player based on the player earning the one or more NFT attributes by completing one or more in-game objectives, satisfying one or more in-game conditions, and/or the like. Thus, in some embodiments, one or more keys stored on the blockchain are unlocked for use by the player in a given electronic game based on player actions or activity in the given electronic game, and the one or more keys are stored in the wallet of the player.

In some embodiments, the wallet is one of a software wallet or a hardware wallet. In some embodiments, the hardware wallet includes one of a secured digital (SD) card, an SD High Capacity card, an SD Extended Capacity (SDXC) card, an SD Ultra Capacity (SDUC) card, a Compact Flash (CF) card, a MicroDrive (MD) card, or a universal serial bus (USB) drive.

In step 708, the computer system applies the one or more NFT attributes to the player character within the first electronic game using the one or more keys. For example, the computer system causes a display of the NFT attributes owned by the player at the computing device of the player, so that the player can select one or more NFT attributes to apply to the player character. Responsive to user selection of the one or more NFT attributes, the computer system applies the one or more NFT attributes. In some embodiments, the computer system further indicates a number of slots or a token capacity for the player character (or relevant in-game asset), and a number of NFT attributes presently applied to the player character. By doing so, the player is informed of how many NFT attributes can be applied to the player character within the first electronic game.

In some embodiments, the computer system determines, using the API, that the player is playing a second electronic game of the one or more electronic games simultaneously with the first electronic game.

In step 712, the computer system receives, from a computer device of the player, a request to apply the one or more NFT attributes to an in-game item within the second electronic game. The in-game item is stored off the blockchain. In some examples, the request is received in connection with an in-game progression event at which a token capacity of the in-game item within the second electronic game is modified.

In step 716, the computer system determines, using the API and responsive to receiving the request, that the one or more NFT attributes are applied to the player character within the first electronic game. For example, the computer system indicates the on-chain cryptographic assets or NFTs that define the one or more NFT attributes to the API, and the API indicates whether each on-chain cryptographic asset or NFT is currently in use. The player character is an example of an in-game asset that is associated with one or more slots for NFT attributes, or a token capacity. As discussed herein, the number of slots or the token capacity of the in-game asset is dynamically modified based on certain events, such as the player character reaching another level of the electronic game, the player completing one or more in-game objectives, and/or the like. As discussed herein, token capacity of an in-game asset can be increased linearly, geometrically, exponentially, or the like.

In step 720, the computer system prevents the one or more NFT attributes from being applied to the in-game item within the second electronic game, responsive to determining that the one or more NFT attributes are applied to the player character within the first electronic game.

In some embodiments, the process further includes the computer system determining that the one or more NFT attributes have become available and then permitting transfer of the one or more NFT attributes from a first electronic game to a second electronic game. For example, the computer system detects that the player has removed an NFT attribute from an in-game asset of the first electronic game and sends a notification to the API to cause an availability state of the NFT attribute to change from unavailable to available. Similarly, the token availability API is automatically re-queried (e.g., by the computer system, by a computer system operating the second electronic game, by a computer device of the player) subsequent to a pre-determined length of time. Based on the re-query and a response provided by the token availability API, the NFT attribute can be applied in a given electronic game.

Transfer of the one or more NFT attributes to a given in-game asset of the second electronic game is still conditional upon the token capacity of the second electronic game. Thus, as discussed herein, application of an NFT attribute to an in-game asset is predicated upon at least an interoperability condition (the NFT attribute is only applied to one electronic game at a time) and a capacity condition (the in-game asset can only have up to a maximum number of NFT attributes applied).

In some embodiments, the computer system identifies a subset of NFT attributes that are not applied within other electronic games and are therefore available to application in a given electronic game. In some embodiments, the computer system provides a visual representation (e.g., within the given electronic game) of the subset of NFT attributes. By doing so, a ping-pong effect of the player repeatedly selecting an unavailable NFT and being faced with an error or a denial is avoided. The player is directly presented with which NFT attributes are available to be applied in a given electronic game.

Figure 8:
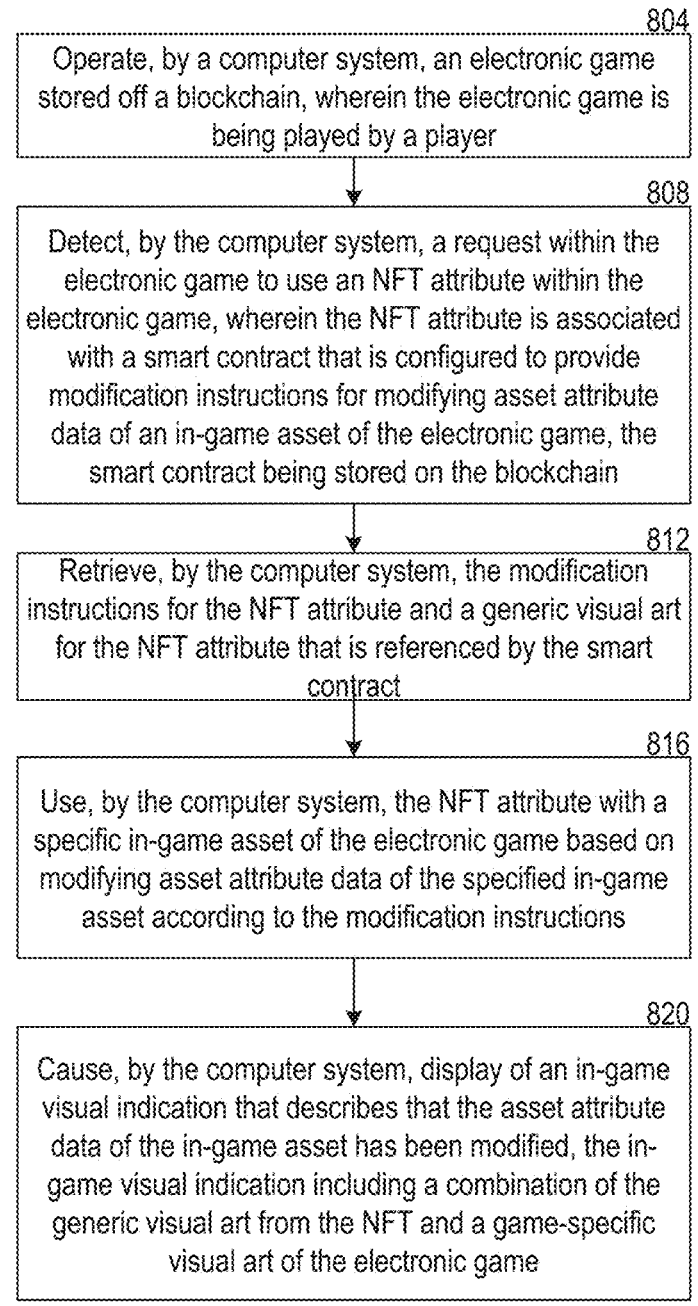
FIG. 8 is a flow diagram illustrating an example process for cryptographic application of non-fungible tokens to electronic gaming.

FIG. 8 is a flow diagram illustrating an example process for cryptographic application of non-fungible tokens to electronic gaming. As discussed, the on-chain cryptographic assets (e.g., NFTs) represent and define attribute modifications. For example, a smart contract component of an NFT defines the respective attribute modification, for example, by defining the given attribute that the attribute modification modifies, by defining an amount by which the given attribute is modified, and/or other parameters associated with the respective attribute modification. Because the smart contract component is primarily directed to defining an attribute modification, individual games can feature different visual representations of the attribute modification and are not limited to digital art referenced by the NFT. In some embodiments, the process is performed by a game server or computer system, e.g., the example computer system 1000 illustrated and described in more detail with reference to FIG. 10.

In step 804, a computer system operates an electronic game stored off a blockchain. The electronic game is being played by a player. An example blockchain 104 is illustrated and described in more detail with reference to FIG. 1.

In step 808, the computer system detects a request within the electronic game to use a non-fungible token (NFT) attribute within the electronic game, wherein the NFT attribute is associated with a smart contract that is configured to provide modification instructions for modifying asset attribute data of an in-game asset of the electronic game, the smart contract being stored on the blockchain.

In step 812, the computer system retrieves the modification instructions for the NFT attribute and a generic visual art for the NFT attribute that is referenced by the smart contract.

In step 816, the computer system uses the NFT attribute with a specified in-game asset of the electronic game based on modifying the asset attribute data of the specified in-game asset according to the modification instructions.

In step 820, the computer system causes display of an in-game visual indication that the asset attribute data of the in-game asset has been modified, the in-game visual indication including a combination of the generic visual art from the NFT and game-specific visual art of the electronic game. In some embodiments, the in-game visual indication is persistently displayed while the asset attribute data remains modified. For example, in response to the asset attribute data being reverted to a pre-modification state (e.g., based on a player input, based on removal/cancellation of the NFT attribute by an interoperability API, based on removal/cancellation of the NFT attribute due to a purchase or sale of the NFT attribute), the computer system ceases display of the in-game visual indication.

In some embodiments, the computer system fails to obtain the generic visual art for the NFT attribute. Some example NFT attributes lack visual art or digital art representations, and simply provide attribute modification instructions (e.g., add ten hit points to asset, increase damage of asset to 25). Accordingly, the computer system can generate the game-specific visual art and use the game-specific visual art to represent the usage of an art-less NFT attribute.

In one example, the computer system operates an electronic game that is being played by a player; detects a request from the player within the electronic game to use a non-fungible token (NFT) attribute within the electronic game, wherein the NFT attribute is associated with a smart contract that is configured to provide modification instructions for modifying asset attribute data of an in-game asset of the electronic game, and wherein the NFT attribute lacks digital art representative of the NFT attribute; uses the NFT attribute with a specified in-game asset of the electronic game based on retrieving the modification instructions and modifying the asset attribute data of the specified in-game asset according to the modification instructions; and causes display of an in-game visual indication that the asset attribute data of the in-game asset has been modified, the in-game visual indication containing a game-specific digital art representation of the NFT attribute.

In one example, the computer system detects a request from a player of an electronic game to use a non-fungible token (NFT) attribute within the electronic game, wherein the NFT attribute is associated with a smart contract that is configured to provide modification instructions for modifying asset attribute data of an in-game asset of the electronic game; operates the electronic game with a specified in-game asset having asset attribute data modified according to the modification instructions in response to the request; and provides a visual indication during operation of the electronic game that the NFT attribute is applied to the specified in-game asset, wherein the visual indication includes a game-specific digital art representation of the NFT attribute that is stored within the electronic game and off of a blockchain.

Figure 9:
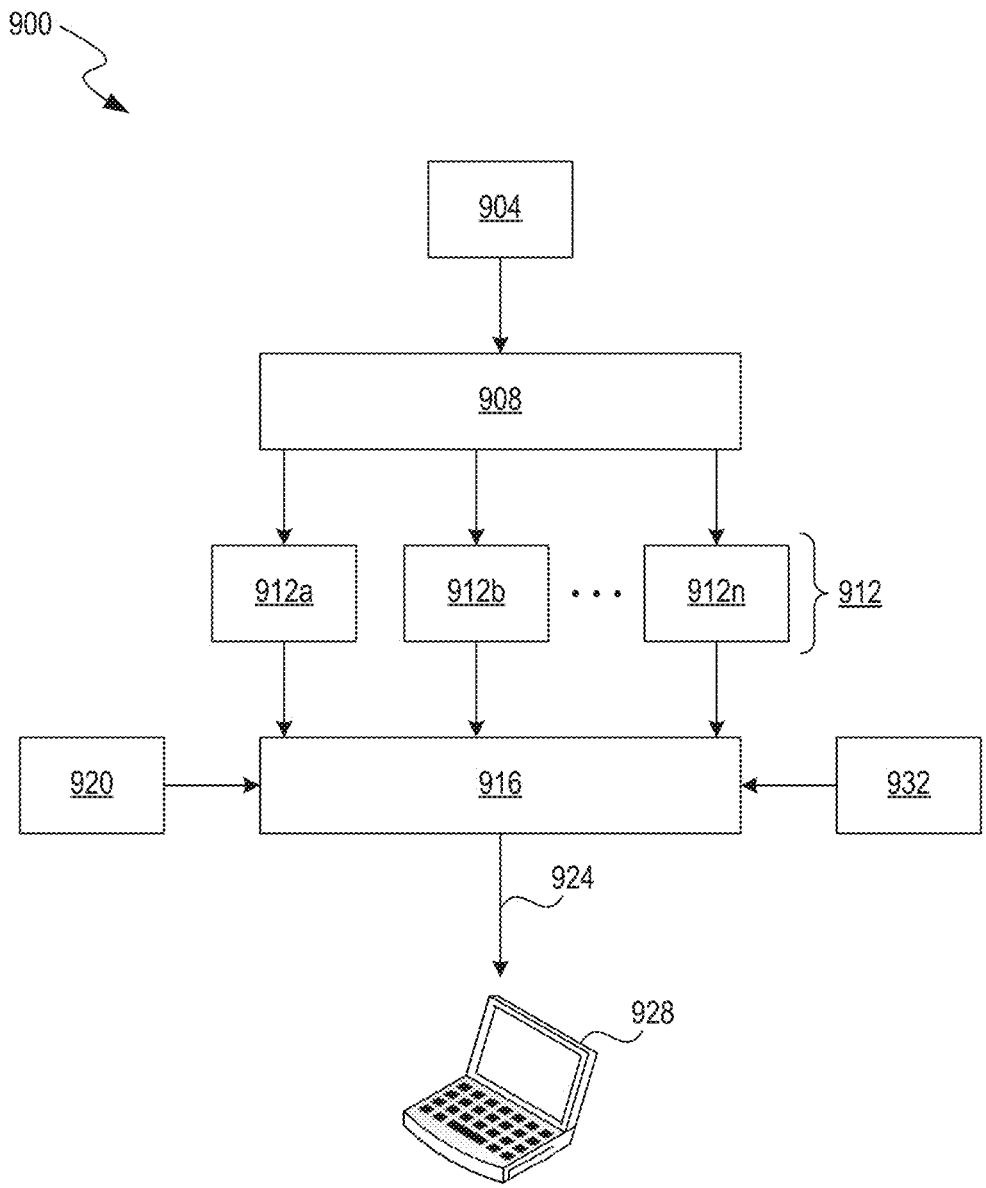
FIG. 9 is a block diagram illustrating an example machine learning (ML) system.

FIG. 9 is a block diagram illustrating an example machine learning (ML) system 300. The ML system 900 is implemented using components of the example computer system 1000 illustrated and described in more detail with reference to FIG. 10. For example, the ML system 900 can be implemented on the computer system 1000 using instructions 1008 programmed in the main memory 1006 illustrated and described in more detail with reference to FIG. 4. Likewise, embodiments of the ML system 900 can include different and/or additional components or be connected in different ways. The ML system 900 is sometimes referred to as a ML module.

The ML system 900 includes a feature extraction module 908 implemented using components of the example computer system 1000 illustrated and described in more detail with reference to FIG. 10. In some embodiments, the feature extraction module 908 extracts a feature vector 912 from input data 904. The feature vector 912 includes features 912a, 912b, . . . , 912n. The feature extraction module 908 reduces the redundancy in the input data 04, e.g., repetitive data values, to transform the input data 904 into the reduced set of features 912, e.g., features 912a, 912b, . . . , 912n. The feature vector 912 contains the relevant information from the input data 904, such that events or data value thresholds of interest can be identified by the ML model 916 by using this reduced representation. In some example embodiments, the following dimensionality reduction techniques are used by the feature extraction module 908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 916 performs deep learning (also known as deep structured learning or hierarchical learning) directly on the input data 904 to learn data representations, as opposed to using task-specific algorithms. In deep learning, no explicit feature extraction is performed; the features 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can thus learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In one example, the ML model 916, e.g., in the form of a CNN generates the output 924, without the need for feature extraction, directly from the input data 904. In some examples, the output 924 is provided to the computer device 928 or video display 1018. The computer device 928 is a server, computer, tablet, smartphone, smart speaker, etc., implemented using components of the example computer system 1000 illustrated and described in more detail with reference to FIG. 10. In some embodiments, the steps performed by the ML system 900 are stored in memory on the computer device 928 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be "fully convolutional," which means that variable sized sensor data vectors can be fed into it. For all convolutional layers, the ML model 916 can specify a kernel size, a stride of the convolution, and an amount of zero padding applied to the input of that layer. For the pooling layers, the model 916 can specify the kernel size and stride of the pooling.

In some embodiments, the ML system 900 trains the ML model 916, based on the training data 920, to correlate the feature vector 912 to expected outputs in the training data 920. As part of the training of the ML model 916, the ML system 900 forms a training set of features and training labels by identifying a positive training set of features that have been determined to have a desired property in question, and, in some embodiments, forms a negative training set of features that lack the property in question.

The ML system 900 applies ML techniques to train the ML model 916, that when applied to the feature vector 912, outputs indications of whether the feature vector 912 has an associated desired property or properties, such as a probability that the feature vector 912 has a particular Boolean property, or an estimated value of a scalar property. The ML system 900 can further apply dimensionality reduction (e.g., via linear discriminant analysis (LDA), PCA, or the like) to reduce the amount of data in the feature vector 912 to a smaller, more representative set of data.

The ML system 900 can use supervised ML to train the ML model 916, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 932 is formed of additional features, other than those in the training data 920, which have already been determined to have or to lack the property in question. The ML system 900 applies the trained ML model 916 to the features of the validation set 932 to quantify the accuracy of the ML model 916. Common metrics applied in accuracy measurement include: Precision and Recall, where Precision refers to a number of results the ML model 916 correctly predicted out of the total it predicted, and Recall is a number of results the ML model 916 correctly predicted out of the total number of features that had the desired property in question. In some embodiments, the ML system 900 iteratively re-trains the ML model 916 until the occurrence of a stopping condition, such as the accuracy measurement indication that the ML model 916 is sufficiently accurate, or a number of training rounds having taken place. The validation set 932 can include data corresponding to confirmed anatomical features, tissue states, tissue conditions, diagnoses, or combinations thereof. This allows the detected values to be validated using the validation set 932. The validation set 932 can be generated based on analysis to be performed.

Figure 10:
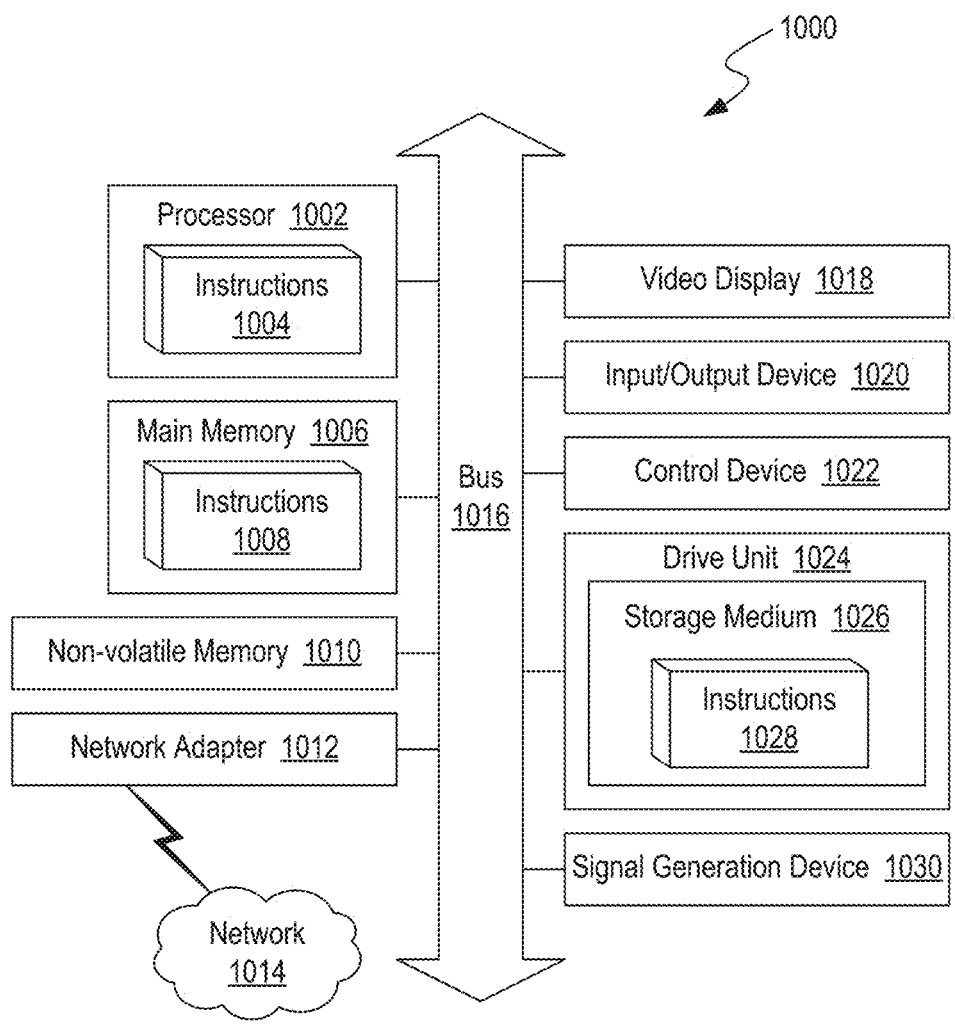
FIG. 10 is a block diagram illustrating an example computer system.

FIG. 10 is a block diagram illustrating an example computer system, in accordance with one or more embodiments. In some embodiments, components of the example computer system 1000 are used to implement the blockchain system 100 or the ML system 900 illustrated and described in more detail with reference to FIGS. 1 and 9. At least some operations described herein can be implemented on the computer system 1000.

The computer system 1000 can include one or more central processing units ("processors") 1002, main memory 1006, non-volatile memory 1010, network adapters 1012 (e.g., network interface), video displays 1018, input/output devices 1020, control devices 1022 (e.g., keyboard and pointing devices), drive units 1024 including a storage medium 1026, and a signal generation device 1020 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1000 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the computer system 1000.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1004, 1008, 1028) set at various times in various memory and storage devices in a computer device. When read and executed by the one or more processors 1002, the instruction(s) cause the computer system 1000 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1012 enables the computer system 1000 to mediate data in a network 1014 with an entity that is external to the computer system 1000 through any communication protocol supported by the computer system 1000 and the external entity. The network adapter 1012 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1012 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

The invention claimed is:

1. A computer-implemented method comprising:
operating, by an electronic gaming computer system (i) communicably coupled to a blockchain network and (ii) hosting a gaming ecosystem including a plurality of electronic games, a particular electronic game of the plurality of electronic games being played by one or more players,
wherein each player of the one or more players is represented by a player character, and
wherein the player character is stored separate from a blockchain provided by the blockchain network;
determining, by the electronic gaming computer system, that a particular player character representing a particular player of the one or more players has reached a first level of the particular electronic game;
responsive to determining that the particular player character has reached the first level, increasing a modification capacity of the particular player character;
in response to user input by the particular player, applying, by the electronic gaming computer system via communication with the blockchain network, a number of attribute modifications that satisfies the modification capacity of the particular player character to the particular player character,
wherein each attribute modification is defined by an on-chain cryptographic asset that is owned by the particular player and defined on the blockchain provided by the blockchain network; and
sending a notification to an application programming interface (API) used by the electronic gaming computer system to host the gaming ecosystem, wherein the notification indicates that the on-chain cryptographic asset for each attribute modification being used within the particular electronic game.

2. The computer-implemented method of claim 1, wherein the attribute modifications are identified using a cryptographic key corresponding to the particular player, wherein the cryptographic key is associated with each on-chain cryptographic asset that is owned by the particular player.

3. The computer-implemented method of claim 1, wherein at least one of the attribute modifications is defined by a particular on-chain cryptographic asset that is owned by the particular player as a result of the particular player satisfying one or more pre-determined conditions within one of the one or more electronic games.

4. The computer-implemented method of claim 1, wherein at least one of the attribute modifications is defined by a particular on-chain cryptographic asset that is owned by the particular player as a result of a purchase of the particular on-chain cryptographic asset by the particular player.

5. The computer-implemented method of claim 1, wherein the API is configured to prevent the attribute modifications defined by the one or more respective cryptographic assets from being applied within a second electronic game of the one or more electronic games.

6. The computer-implemented method of claim 1, wherein the particular electronic game is a first electronic game of the one or more electronic games, and wherein the computer-implemented method further comprises:
   determining that the one or more attribute modifications are no longer applied to the particular player character in the first electronic game; and
   permitting use of the one or more cryptographic assets in a second electronic game of the one or more electronic games.

7. The computer-implemented method of claim 6, wherein use of the one or more cryptographic assets in the second electronic game includes application of the one or more modifications to a second player character within the second electronic game associated with the particular player.

8. An electronic gaming computer system A-computer-system comprising:
   one or more hardware computer processors; and
   at least one non-transitory computer-readable storage medium storing computer instructions, which when executed by the one or more computer processors, cause the system to:
      operate an electronic game within a gaming ecosystem including a plurality of electronic games, the electronic game being played by one or more players, wherein each player is associated with one or more in-game assets of the electronic game,
         wherein the one or more in-game assets are stored separate from a blockchain provided by a blockchain network with which the electronic gaming computer system is communicably coupled;
      detect an occurrence of a progression event related to a particular in-game asset associated with a particular player,
         wherein the progression event is defined by one or more game conditions related to at least one of the particular player or the particular in-game asset;
      in response to the occurrence, increase an upgrade capacity of the particular in-game asset,
         wherein the upgrade capacity controls a maximum number of attribute upgrades that are applied to the particular in-game asset,
         wherein the attribute upgrades are defined by on-chain cryptographic assets;
      based on a determination that a number of attribute upgrades presently applied to the particular in-game asset is less than the upgrade capacity, apply, via communication with the blockchain network, a particular attribute upgrade defined by a particular on-chain cryptographic asset owned by the particular player to the particular in-game asset, the particular on-chain cryptographic asset being defined on the blockchain provided by the blockchain network; and
      transmit a notification to an application programming interface (API) used by the electronic gaming computer system to host the gaming ecosystem, wherein the notification indicates that the particular on-chain cryptographic asset is in use for the electronic game.

9. The electronic gaming computer system of claim 8, wherein applying the particular attribute upgrade includes determining that the particular on-chain cryptographic asset is owned by the particular player according to a cryptographic key associated with the particular on-chain cryptographic asset corresponding to the particular player.

10. The electronic gaming computer system of claim 8, wherein the particular on-chain cryptographic asset is minted on the blockchain in response to the particular player satisfying one or more in-game conditions of the electronic game.

11. The electronic gaming computer system of claim 8, wherein the upgrade capacity of the particular in-game asset is increased linearly, geometrically, or exponentially in response to each occurrence of the progression event.

12. The electronic gaming computer system of claim 8, wherein the instructions further cause the system to:
   cause display of a plurality of attribute upgrades applied to the particular in-game asset in connection with a visual representation of the particular in-game asset.

13. The electronic gaming computer system of claim 12, wherein the display of the plurality of attribute upgrades includes a visual representation of each attribute upgrade using a combination of (i) digital art referenced by the on-chain cryptographic asset for each attribute and (ii) game-specific digital-art.

14. The electronic gaming computer system of claim 8, wherein the notification to the API causes the API to prevent use of the particular on-chain cryptographic asset in other electronic games.

15. A non-transitory computer-readable storage medium storing computer instructions, which when executed by one or more computer processors of an electronic gaming computer system, cause the one or more computer processors to:
   operate a particular electronic game of a plurality of electronic games in a shared gaming ecosystem,
      wherein the particular electronic game includes a plurality of in-game assets associated with a plurality of players,
      wherein the plurality of in-game assets are stored separate from a blockchain provided by a blockchain network with which the electronic gaming computer system is communicably coupled;
   detect an occurrence of a progression event for a particular in-game asset of the particular electronic game, wherein the progression event is based on one or more conditions associated with the particular in-game asset being fulfilled;
   modify, in response to the occurrence, a capacity parameter associated with the particular in-game asset;
   identify, via communication with the blockchain network, a set of on-chain cryptographic assets that are owned by a particular player associated with the particular in-game asset, the set of on-chain cryptographic assets being defined on the blockchain provided by the blockchain network;
   cause, for the particular player, display of a number of on-chain cryptographic assets of the set of on-chain cryptographic assets for application to the particular in-game asset, wherein the number of on-chain cryptographic assets is based on the capacity parameter and a current number of on-chain cryptographic assets applied to the particular in-game asset; and in response to a selection of a particular on-chain cryptographic asset from the set of on-chain cryptographic assets by the particular player, send a notification to an API used by the electronic gaming computer system to host the gaming ecosystem, wherein the notification indicates that the particular on-chain cryptographic asset is being used within the particular electronic game.

16. The non-transitory computer-readable storage medium of claim 15, wherein the instructions further cause the one or more computer processors to:

apply the particular on-chain cryptographic asset to the particular in-game asset, wherein applying the particular on-chain cryptographic asset includes modifying an attribute of the particular in-game asset by an amount defined by the particular on-chain cryptographic asset; and wherein the notification causes the API to prevent use of the particular on-chain cryptographic asset in other electronic games in the shared gaming ecosystem.

17. The non-transitory computer-readable storage medium of claim 16, wherein applying the particular on-chain cryptographic asset further includes:

combining digital art referenced by the particular on-chain cryptographic asset with in-game digital art to form a visual representation of the in-game asset; and causing presentation of the visual representation of the in-game asset.

18. The non-transitory computer-readable storage medium of claim 15, wherein the set of on-chain cryptographic assets is identified via a cryptographic key corresponding to the particular player being associated with the set of on-chain cryptographic assets on the blockchain provided by the blockchain network.

19. The non-transitory computer-readable storage medium of claim 15, wherein modifying the capacity parameter includes increasing the capacity parameter by one of a linear factor, a geometric factor, or an exponential factor.

20. The non-transitory computer-readable storage medium of claim 15, wherein the set of on-chain cryptographic assets is further identified based on one or more rules of the particular electronic game that controls applicability of certain on-chain cryptographic assets to the particular in-game asset.

* * * * *